United States Patent
Park et al.

(10) Patent No.: US 10,193,398 B2
(45) Date of Patent: Jan. 29, 2019

(54) WIRELESS POWER TRANSFER AND RECEIVE METHOD, APPARATUS AND SYSTEM

(71) Applicant: LG ELECTRONICS INC., Seoul (KR)

(72) Inventors: Yongcheol Park, Seoul (KR); Hyunbeom Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 253 days.

(21) Appl. No.: 15/109,098

(22) PCT Filed: Feb. 6, 2015

(86) PCT No.: PCT/KR2015/001249
§ 371 (c)(1),
(2) Date: Jun. 29, 2016

(87) PCT Pub. No.: WO2015/119458
PCT Pub. Date: Aug. 13, 2015

(65) Prior Publication Data
US 2016/0329755 A1    Nov. 10, 2016

Related U.S. Application Data

(60) Provisional application No. 61/936,889, filed on Feb. 7, 2014, provisional application No. 61/979,867, filed (Continued)

(30) Foreign Application Priority Data

Jan. 28, 2015    (KR) ........................ 10-2015-0013716

(51) Int. Cl.
*H01F 27/42* (2006.01)
*H02J 50/80* (2016.01)
*H02J 7/02* (2016.01)

(52) U.S. Cl.
CPC .............. *H02J 50/80* (2016.02); *H02J 7/025* (2013.01)

(58) Field of Classification Search
CPC .. H02J 50/12; H02J 50/80; H02J 7/025; H02J 5/005
See application file for complete search history.

(56) References Cited

U.S. PATENT DOCUMENTS

2010/0045114 A1    2/2010 Sample et al.
2012/0169136 A1    7/2012 Lisi et al.
(Continued)

FOREIGN PATENT DOCUMENTS

| CN | 103427499 | 12/2013 |
| KR | 10-2012-0132225 | 12/2012 |

(Continued)

OTHER PUBLICATIONS

PCT International Application No. PCT/KR2015/001249, International Search Report dated Apr. 29, 2015, 2 pages.
(Continued)

*Primary Examiner* — Sibin Chen
(74) *Attorney, Agent, or Firm* — Lee, Hong, Degerman, Kang & Waimey

(57) ABSTRACT

The present disclosure relates to a wireless power transmission and reception method, a wireless power transmission and reception apparatus, and a wireless charging system in a wireless power transmission and reception field, and the method may include sensing whether or not there exists a wireless power receiver within a range capable of transmitting power in a wireless manner, sending a detection signal to the wireless power receiver, allowing the wireless power receiver to receive at least one of an identification packet and a setting packet transmitted in a first mode, determining whether or not to perform communication in either one of
(Continued)

the first mode and a second mode different from the first mode based on the setting packet, and transmitting power to the wireless power receiver while performing communication in the determined either one mode, wherein the setting packet comprises an operation mode indicating a communication execution mode of the wireless power receiver.

12 Claims, 19 Drawing Sheets

Related U.S. Application Data on Apr. 15, 2014, provisional application No. 62/001,974, filed on May 22, 2014.

(56) References Cited

U.S. PATENT DOCUMENTS

2012/0299389 A1* 11/2012 Lee ..................... H04B 5/0031
                                                              307/104

2014/0009109 A1    1/2014 Lee et al.

FOREIGN PATENT DOCUMENTS

| WO | 2013/103756 | 7/2013 |
|----|-------------|--------|
| WO | 2013/176751 | 11/2013 |

OTHER PUBLICATIONS

Korean Intellectual Property Office Application Serial No. 10-2015-0013716, Office Action dated May 31, 2015, 6 pages.
State Intellectual Property Office of the People's Republic of China Application Serial No. 201580007235.6, Office Action dated Jan. 17, 2018, 11 pages.

* cited by examiner

FIG. 22

|    | b7          | b6    | b5       | b4       | b3 | b2      | b1         | b0 |
|----|-------------|-------|----------|----------|----|---------|------------|----|
| B0 | POWER CLASS |       |          | MAXIMUM POWER | | | | |
| B1 | RESERVED    |       |          |          |    |         |            |    |
| B2 | PROP        | OP MODE | RESERVED | RESERVED | X  | COUNT   |            |    |
| B3 | WINDOW SIZE |       |          |          |    |         | WINDOW OFFSET | |
| B4 | NEG         | FSK POLARITY | FSK DEPTH | | RESERVED | | | |

| Tx | Rx |
|----|-------|
| 00 | 00/11 |
| 01 | 00 |
| 01 | 11 |
| 11 | 00 |
| 11 | 11 |

| Tx | Rx |
|----|----|
| 0 | 0 |
| 1 | 0 |
| 0 | 1 |
| 1 | 1 |

WIRELESS POWER TRANSFER AND RECEIVE METHOD, APPARATUS AND SYSTEM

CROSS-REFERENCE TO RELATED APPLICATIONS

This application is the National Stage filing under 35 U.S.C. 371 of International Application No. PCT/KR2015/001249, filed on Feb. 6, 2015, which claims the benefit of earlier filing date and right of priority to Korean Application No. 10-2015-0013716, filed on Jan. 28, 2015, and also claims the benefit of U.S. Provisional Application Nos. 61/936,889, filed on Feb. 7, 2014, 61/979,867, filed on Apr. 15, 2014 and 62/001,974, filed on May. 22, 2014, the contents of which are all hereby incorporated by reference herein in their entirety.

TECHNICAL FIELD

The present disclosure relates to a wireless power transmission and reception method, a wireless power transmission and reception apparatus, and a wireless charging system in a wireless power transmission and reception field.

BACKGROUND ART

In recent years, the method of contactlessly supplying electrical energy to wireless power receivers in a wireless manner has been used instead of the traditional method of supplying electrical energy in a wired manner. The wireless power receiver receiving energy in a wireless manner may be directly driven by the received wireless power, or a battery may be charged by using the received wireless power, then allowing the wireless power receiver to be driven by the charged power.

For allowing smooth wireless power transfer between a wireless power transmitter which transmits power in a wireless manner and a wireless power receiver which receives power in a wireless manner, the standardization for a technology related to the wireless power transfer is undergoing.

As part of the standardization for the wireless power transfer technology, the Wireless Power Consortium (WPC) which manages technologies for a magnetic inductive wireless power transfer has published a standard document "System description Wireless Power Transfer, Volume 1, Low Power, Part 1: Interface Definition, Version 1.00 Release Candidate 1 (RC1)" for interoperability in the wireless power transfer on Apr. 12, 2010.

On the other hand, Power Matters Alliance as another technology standardization consortium has been established on March 2012, developed a product line of interface standards, and published a standard document based on an inductive coupling technology for providing inductive and resonant power.

A wireless charging method using electromagnetic induction is frequently encountered in our lives, and for example, wireless charging method using electromagnetic induction is utilized by being commercialized in electric toothbrushes, wireless coffee ports and the like.

In recent years, since the requirement of one-to-many charging increases in addition to a one-to-one mode, various methods for a control method associated with one-to-may charging modes have been proposed.

Accordingly, the present disclosure proposes a method of allowing a wireless power transmitter and wireless power receivers to perform communication and transmit power in a one-to-many charging mode.

DISCLOSURE OF THE INVENTION

An aspect of the present disclosure is to provide a method of electrically implementing a variable capacitor.

Furthermore, another aspect of the present disclosure is to prevent overcurrent when implementing a variable capacitor.

In addition, still another object of the present disclosure is to provide a method of controlling power in a wireless power receiver or wireless power transmitter.

There is disclosed a control method of a wireless power transmitter for transmitting power in a wireless manner, and the method may include sensing whether or not there exists a wireless power receiver within a range capable of transmitting power in a wireless manner, sending a detection signal to the wireless power receiver, allowing the wireless power receiver to receive at least one of an identification packet and a setting packet transmitted in a first mode, determining whether or not to perform communication in either one of the first mode and a second mode different from the first mode based on the setting packet, and transmitting power to the wireless power receiver while performing communication in the determined either one mode, wherein the setting packet comprises an operation mode indicating a communication execution mode of the wireless power receiver.

According to an embodiment, the operation mode may be either one of inductive mode information in which one wireless power transmitter performs communication with one wireless power receiver and resonant mode information in which one wireless power transmitter performs communication with a plurality of wireless power receivers.

According to an embodiment, said transmitting power may perform communication with the wireless power receiver according to the inductive mode information while transmitting the power when the operation mode information is the inductive mode information, and perform communication with the wireless power receiver according to the resonant mode information while transmitting the power when the operation mode information is the resonant mode information.

According to an embodiment, when the operation mode information is resonant mode information, the method may further include transmitting a first sync signal linked to a first slot among a plurality of slots, receiving control information from a wireless power receiver within the first slot in response to the first sync signal, and determining whether or not to allocate the first slot to the wireless power receiver.

According to an embodiment, when the first slot is not allocated to the wireless power receiver, the method may further include transmitting a second sync signal linked to a second slot different from the first slot among the plurality of slots, receiving control information from the wireless power receiver within the second slot in response to the second sync signal, and determining whether or not to allocate the second slot to the wireless power receiver.

According to an embodiment, the first sync signal and the second sync signal may have a pattern or packet form.

According to an embodiment, operation mode information may be transmitted to the wireless power receiver through the first slot.

According to an embodiment, the method may further include transmitting a setting packet of the wireless power transmitter to the wireless power receiver based on the operation mode information, wherein the setting packet comprises the operation mode information of the wireless power transmitter.

According to an embodiment, when the operation mode information is a second mode, but the second mode is not supported, communication error information may be transmitted to the wireless power receiver, and power may not be transmitted to the wireless power receiver.

There is disclosed a control method of a wireless power receiver for receiving power in a wireless manner, and the method may include receiving a detection signal from a wireless power transmitter for transmitting power in a wireless manner, transmitting at least one of an identification packet and a setting packet to the wireless power transmitter in a first mode, determining whether or not to perform communication in either one of the first mode and a second mode different from the first mode based on the setting packet, and receiving power from the wireless power transmitter while performing communication in the determined either one mode, wherein the setting packet comprises an operation mode indicating a communication execution mode of the wireless power receiver.

According to an embodiment, the operation mode may be either one of inductive mode information in which one wireless power transmitter transmits power to one wireless power receiver and resonant mode information in which one wireless power transmitter transmits power to a plurality of wireless power receivers.

According to an embodiment, communication may be carried out between the wireless power transmitter and the wireless power receiver based on the operation mode information.

According to an embodiment, power may be received from the wireless power transmitter when the operation mode information is inductive mode information, and preset packets containing a power control message may be sequentially transmitted to the wireless power transmitter when the operation mode information is resonant mode information.

According to an embodiment, when the detection signal is received, a communication execution mode with the wireless power transmitter may be determined, and a setting packet containing operation mode information indicating the determined communication execution mode may be transmitted.

According to an embodiment, when communication error information is received in response to the setting packet, power may not be received from the wireless power transmitter.

BRIEF DESCRIPTION OF THE DRAWINGS

FIGS. 22 and 23 are structural diagrams illustrating the structure of a setting packet.

DETAILED DESCRIPTION OF THE PREFERRED EMBODIMENTS

Figure 1:
FIG. 1 is an exemplary view conceptually illustrating a wireless power transmitter and a wireless power receiver according to the embodiments of the present invention.

The technologies disclosed herein may be applicable to wireless power transmission (contactless power transmission). However, the technologies disclosed herein are not limited to this, and may be also applicable to all kinds of power transmission systems and methods, wireless charging circuits and methods to which the technological spirit of the technology can be applicable, in addition to the methods and apparatuses using power transmitted in a wireless manner.

It should be noted that technological terms used herein are merely used to describe a specific embodiment, but not to limit the present invention. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms unable to correctly express the spirit of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

In addition, a suffix "module" or "unit" used for constituent elements disclosed in the following description is merely intended for easy description of the specification, and the suffix itself does not give any special meaning or function.

Furthermore, the terms including an ordinal number such as first, second, etc. can be used to describe various elements, but the elements should not be limited by those terms. The terms are used merely for the purpose to distinguish an element from the other element. For example, a first element may be named to a second element, and similarly, a second element may be named to a first element without departing from the scope of right of the invention.

Hereinafter, preferred embodiments of the present invention will be described in detail with reference to the accompanying drawings, and the same or similar elements are designated with the same numeral references regardless of the numerals in the drawings and their redundant description will be omitted.

In describing the present invention, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the spirit of the invention by the accompanying drawings.

Definition

Many-to-one communication: communicating between one transmitter (Tx) and many receivers (Rx) Unidirectional communication: transmitting a required message only from a receiver to a transmitter Here, the transmitter and the receiver indicate the same as a transmitting unit (device) and a receiving unit (device), respectively. Hereinafter, those terms may be used together.

Conceptual view of wireless power transmitter and wireless power receiver

FIG. 1 is an exemplary view conceptually illustrating a wireless power transmitter and a wireless power receiver according to the embodiments of the present invention.

Referring to FIG. 1, the wireless power transmitter 100 may be a power transfer apparatus configured to transfer power required for the wireless power receiver 200 in a wireless manner.

Furthermore, the wireless power transmitter 100 may be a wireless charging apparatus configured to charge a battery of the wireless power receiver 200 by transferring power in a wireless manner. A case where the wireless power transmitter 100 is a wireless charging apparatus will be described later with reference to FIG. 9.

Additionally, the wireless power transmitter 100 may be implemented with various forms of apparatuses transferring power to the wireless power receiver 200 requiring power in a contactless state.

The wireless power receiver 200 is a device that is operable by receiving power from the wireless power transmitter 100 in a wireless manner. Furthermore, the wireless power receiver 200 may charge a battery using the received wireless power.

On the other hand, an electronic device for receiving power in a wireless manner as described herein should be construed broadly to include a portable phone, a cellular phone, a smart phone, a personal digital assistant (PDA), a portable multimedia player (PMP), a tablet, a multimedia device, or the like, in addition to an input/output device such as a keyboard, a mouse, an audio-visual auxiliary device, and the like.

The wireless power receiver 200, as described later, may be a mobile communication terminal (for example, a portable phone, a cellular phone, and a tablet and the like) or a multimedia device.

On the other hand, the wireless power transmitter 100 may transfer power in a wireless manner without mutual contact to the wireless power receiver 200 using one or more wireless power transfer methods. In other words, the wireless power transmitter 100 may transfer power using at least one of an inductive coupling method based on magnetic induction phenomenon by the wireless power signal and a magnetic resonance coupling method based on electromagnetic resonance phenomenon by a wireless power signal at a specific frequency.

Wireless power transfer in the inductive coupling method is a technology transferring power in a wireless manner using a primary coil and a secondary coil, and refers to the transmission of power by inducing a current from a coil to another coil through a changing magnetic field by a magnetic induction phenomenon.

Wireless power transfer in the inductive coupling method refers to a technology in which the wireless power receiver 200 generates resonance by a wireless power signal transmitted from the wireless power transmitter 100 to transfer power from the wireless power transmitter 100 to the wireless power receiver 200 by the resonance phenomenon.

Hereinafter, the wireless power transmitter 100 and wireless power receiver 200 according to the embodiments disclosed herein will be described in detail. In assigning reference numerals to the constituent elements in each of the following drawings, the same reference numerals will be used for the same constituent elements even though they are shown in a different drawing.

Figure 2A:
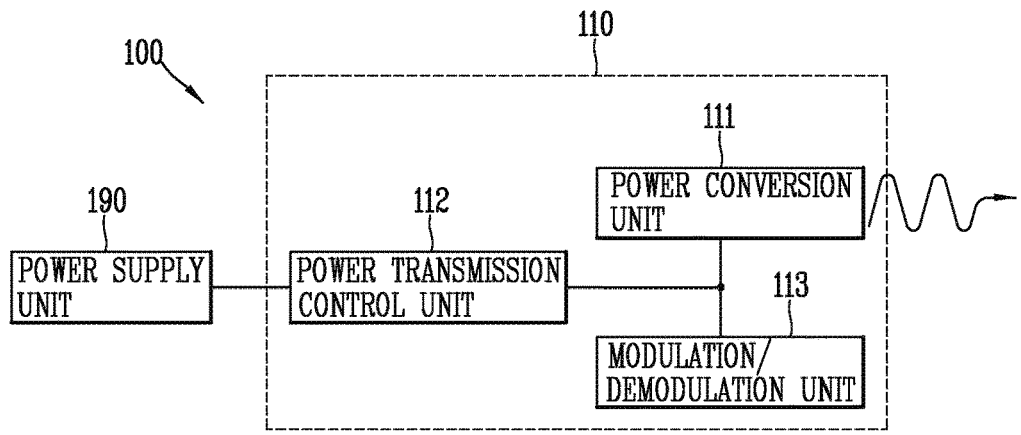
FIGS. 2A and 2B are exemplary block diagrams illustrating the configuration of a wireless power transmitter and a wireless power receiver that can be employed in the embodiments disclosed herein, respectively.
Figure 2B:
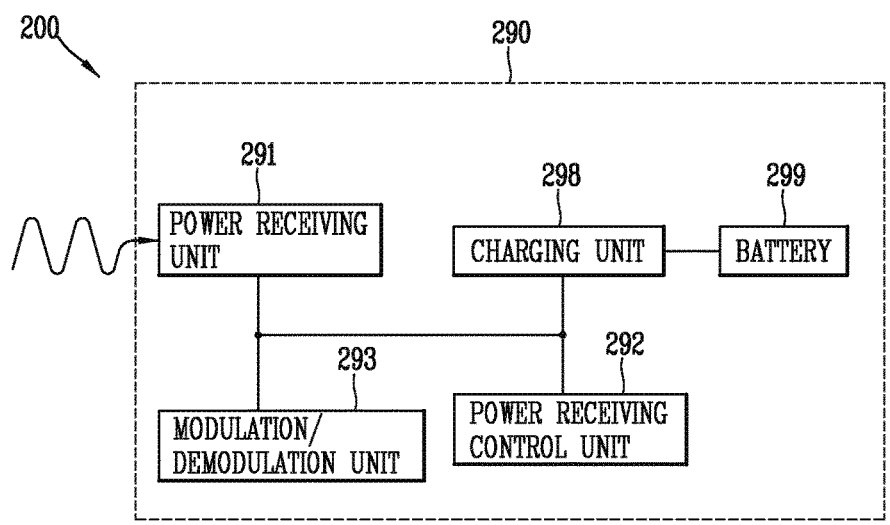

FIGS. 2A and 2B are exemplary block diagrams illustrating the configuration of a wireless power transmitter 100 and a wireless power receiver 200 that can be employed in the embodiments disclosed herein.

Wireless Power Transmitter

Referring to FIG. 2A, the wireless power transmitter 100 may include a power transmission unit 110. The power transmission unit 110 may include a power conversion unit 111 and a power transmission control unit 112.

The power conversion unit 111 transfers power supplied from a transmission side power supply unit 190 to the wireless power receiver 200 by converting it into a wireless power signal. The wireless power signal transferred by the power conversion unit 111 is generated in the form of a magnetic field or electro-magnetic field having an oscillation characteristic. For this purpose, the power conversion unit 111 may be configured to include a coil for generating the wireless power signal.

The power conversion unit 111 may include a constituent element for generating a different type of wireless power signal according to each power transfer method. For example, the power conversion unit 111 may include a primary coil for forming a changing magnetic field to induce a current to a secondary coil of the wireless power receiver 200. Furthermore, the power conversion unit 111 may include a coil (or antenna) for forming a magnetic field having a specific resonant frequency to generate a resonant frequency in the wireless power receiver 200 according to the resonance coupling method.

Furthermore, the power conversion unit 111 may transfer power using at least one of the foregoing inductive coupling method and the resonance coupling method.

Among the constituent elements included in the power conversion unit 111, those for the inductive coupling method will be described later with reference to FIGS. 4 and 5, and those for the resonance coupling method will be described with reference to FIGS. 7 and 8.

On the other hand, the power conversion unit 111 may further include a circuit for controlling the characteristics of a used frequency, an applied voltage, an applied current or the like to form the wireless power signal.

The power transmission control unit 112 controls each of the constituent elements included in the power transmission unit 110. The power transmission control unit 112 may be implemented to be integrated into another control unit (not shown) for controlling the wireless power transmitter 100.

On the other hand, a region to which the wireless power signal can be approached may be divided into two types. First, an active area denotes a region through which a wireless power signal transferring power to the wireless power receiver 200 is passed. Next, a semi-active area denotes an interest region in which the wireless power transmitter 100 can detect the existence of the wireless power receiver 200. Here, the power transmission control unit 112 may detect whether the wireless power receiver 200 is placed in the active area or detection area or removed from the area. Specifically, the power transmission control unit 112 may detect whether or not the wireless power receiver 200 is placed in the active area or detection area using a wireless power signal formed from the power conversion unit 111 or a sensor separately provided therein. For instance, the power transmission control unit 112 may detect the presence of the wireless power receiver 200 by monitoring whether or not the characteristic of power for forming the wireless power signal is changed by the wireless power signal, which is affected by the wireless power receiver 200 existing in the detection area. However, the active area and detection area may vary according to the wireless power transfer method such as an inductive coupling method, a resonance coupling method, and the like.

The power transmission control unit 112 may perform the process of identifying the wireless power receiver 200 or determine whether to start wireless power transfer according to a result of detecting the existence of the wireless power receiver 200.

Furthermore, the power transmission control unit 112 may determine at least one characteristic of a frequency, a voltage, and a current of the power conversion unit 111 for forming the wireless power signal. The determination of the characteristic may be carried out by a condition at the side of the wireless power transmitter 100 or a condition at the side of the wireless power receiver 200.

The power transmission control unit 112 may receive a power control message from the wireless power receiver 200. The power transmission control unit 112 may determine at least one characteristic of a frequency, a voltage and a current of the power conversion unit 111 based on the received power control message, and additionally perform other control operations based on the power control message.

For example, the power transmission control unit 112 may determine at least one characteristic of a frequency, a voltage and a current used to form the wireless power signal according to the power control message including at least one of rectified power amount information, charging state information and identification information in the wireless power receiver 200.

Furthermore, as another control operation using the power control message, the wireless power transmitter 100 may perform a typical control operation associated with wireless power transfer based on the power control message. For example, the wireless power transmitter 100 may receive information associated with the wireless power receiver 200 to be auditorily or visually outputted through the power control message, or receive information required for authentication between devices.

In exemplary embodiments, the power transmission control unit 112 may receive the power control message through the wireless power signal. In other exemplary embodiment, the power transmission control unit 112 may receive the power control message through a method for receiving user data.

In order to receive the foregoing power control message, the wireless power transmitter 100 may further include a modulation/demodulation unit 113 electrically connected to the power conversion unit 111. The modulation/demodulation unit 113 may modulate a wireless power signal that has been modulated by the wireless power receiver 200 and use it to receive the power control message.

In addition, the power transmission control unit 112 may acquire a power control message by receiving user data including a power control message by a communication means (not shown) included in the wireless power transmitter 100.

[For Supporting In-band Two-way Communication]

Under a wireless power transfer environment allowing for bi-directional communications according to the exemplary embodiments disclosed herein, the power transmission control unit 112 may transmit data to the wireless power receiver 200. The data transmitted by the power transmission control unit 112 may be transmitted to request the wireless power receiver 200 to send the power control message.

Wireless Power Receiver

Referring to FIG. 2B, the wireless power receiver 200 may include a power supply unit 290. The power supply unit 290 supplies power required for the operation of the wireless power receiver 200. The power supply unit 290 may include a power receiving unit 291 and a power reception control unit 292.

The power receiving unit 291 receives power transferred from the wireless power transmitter 100 in a wireless manner.

The power receiving unit 291 may include constituent elements required to receive the wireless power signal according to a wireless power transfer method. Furthermore, the power receiving unit 291 may receive power according to at least one wireless power transfer method, and in this case, the power receiving unit 291 may include constituent elements required for each method.

First, the power receiving unit 291 may include a coil for receiving a wireless power signal transferred in the form of a magnetic field or electromagnetic field having a vibration characteristic.

For instance, as a constituent element according to the inductive coupling method, the power receiving unit 291 may include a secondary coil to which a current is induced by a changing magnetic field. In exemplary embodiments, the power receiving unit 291, as a constituent element according to the resonance coupling method, may include a coil and a resonant circuit in which resonance phenomenon is generated by a magnetic field having a specific resonant frequency.

In another exemplary embodiments, when the power receiving unit 291 receives power according to at least one wireless power transfer method, the power receiving unit 291 may be implemented to receive power by using a coil, or implemented to receive power by using a coil formed differently according to each power transfer method.

Among the constituent elements included in the power receiving unit 291, those for the inductive coupling method will be described later with reference to FIG. 4, and those for the resonance coupling method with reference to FIG. 7.

On the other hand, the power receiving unit 291 may further include a rectifier and a regulator to convert the wireless power signal into a direct current. Furthermore, the power receiving unit 291 may further include a circuit for protecting an overvoltage or overcurrent from being generated by the received power signal.

The power reception control unit 292 may control each constituent element included in the power supply unit 290.

Specifically, the power reception control unit 292 may transfer a power control message to the wireless power transmitter 100. The power control message may instruct the wireless power transmitter 100 to initiate or terminate a transfer of the wireless power signal. Furthermore, the power control message may instruct the wireless power transmitter 100 to control a characteristic of the wireless power signal.

In exemplary embodiments, the power reception control unit 292 may transmit the power control message through at least one of the wireless power signal and user data.

In order to transmit the foregoing power control message, the wireless power receiver 200 may further include a modulation/demodulation unit 293 electrically connected to the power receiving unit 291. The modulation/demodulation unit 293, similarly to the case of the wireless power transmitter 100, may be used to transmit the power control message through the wireless power signal. The power communications modulation/demodulation unit 293 may be used as a means for controlling a current and/or voltage flowing through the power conversion unit 111 of the wireless power transmitter 100. Hereinafter, a method for allowing the power communications modulation/demodulation unit 113 or 293 at the side of the wireless power transmitter 100 and at the side of the wireless power receiver 200, respectively, to be used to transmit and receive a power control message through a wireless power signal will be described.

A wireless power signal formed by the power conversion unit 111 is received by the power receiving unit 291. At this time, the power reception control unit 292 controls the power communications modulation/demodulation unit 293 at the side of the wireless power receiver 200 to modulate the wireless power signal. For instance, the power reception control unit 292 may perform a modulation process such that a power amount received from the wireless power signal is varied by changing a reactance of the power communications modulation/demodulation unit 293 connected to the power receiving unit 291. The change of a power amount received from the wireless power signal results in the change of a current and/or voltage of the power conversion unit 111 for forming the wireless power signal. At this time, the modulation/demodulation unit 113 at the side of the wireless power transmitter 100 may detect a change of the current and/or voltage to perform a demodulation process.

In other words, the power reception control unit 292 may generate a packet including a power control message intended to be transferred to the wireless power transmitter 100 and modulate the wireless power signal to allow the packet to be included therein, and the power transmission control unit 112 may decode the packet based on a result of performing the demodulation process of the power communications modulation/demodulation unit 113 to acquire the power control message included in the packet.

In addition, the power reception control unit 292 may transmit a power control message to the wireless power transmitter 100 by transmitting user data including the power control message by a communication means (not shown) included in the wireless power receiver 200.

[For Supporting In-band Two-way Communication]

Under a wireless power transfer environment allowing for bi-directional communications according to the exemplary embodiments disclosed herein, the power reception control unit 292 may receive data to the wireless power transmitter 100. The data transmitted by the wireless power transmitter 100 may be transmitted to request the wireless power receiver 200 to send the power control message.

In addition, the power supply unit 290 may further include a charger 298 and a battery 299.

The wireless power receiver 200 receiving power for operation from the power supply unit 290 may be operated by power transferred from the wireless power transmitter 100, or operated by charging the battery 299 using the transferred power and then receiving the charged power. At this time, the power reception control unit 292 may control the charger 298 to perform charging using the transferred power.

Hereinafter, description will be given of a wireless power transmitter and a wireless power receiver applicable to the exemplary embodiments disclosed herein. First, a method of allowing the wireless power transmitter to transfer power to the electronic device according to the inductive coupling method will be described with reference to FIGS. 3 through 5.

Inductive Coupling Method

Figure 3:
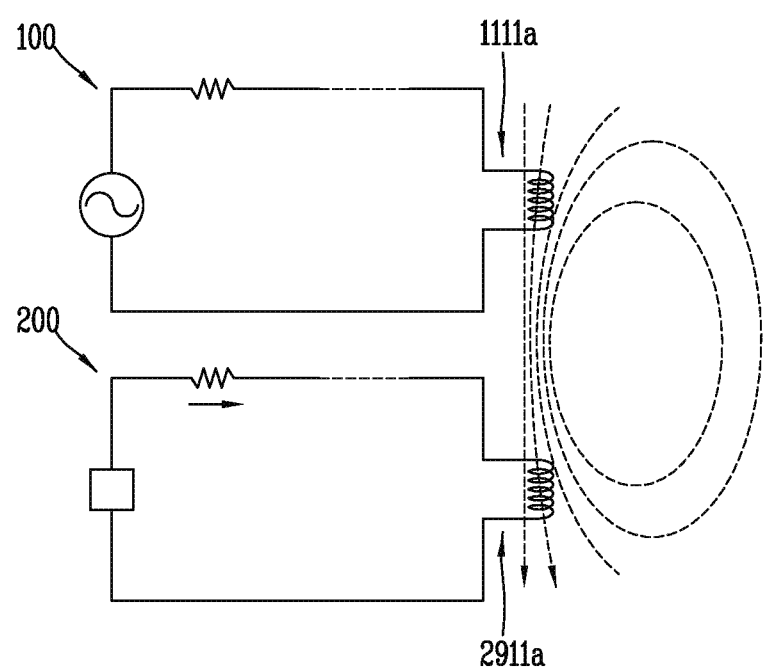
FIG. 3 is a view illustrating a concept in which power is transferred from a wireless power transmitter to a wireless power receiver in a wireless manner according to an inductive coupling method.

FIG. 3 is a view illustrating a concept in which power is transferred from a wireless power transmitter to an electronic device in a wireless manner according to an inductive coupling method.

When the power of the wireless power transmitter 100 is transferred in an inductive coupling method, if the strength of a current flowing through a primary coil within the power transmission unit 110 is changed, then a magnetic field passing through the primary coil will be changed by the current. The changed magnetic field generates an induced electromotive force at a secondary coil in the wireless power receiver 200.

According to the foregoing method, the power conversion unit 111 of the wireless power transmitter 100 may include a transmitting (Tx) coil 1111*a* being operated as a primary coil in magnetic induction. Furthermore, the power receiving unit 291 of the wireless power receiver 200 may include a receiving (Rx) coil 2911a being operated as a secondary coil in magnetic induction.

First, the wireless power transmitter 100 and wireless power receiver 200 are disposed in such a manner that the transmitting coil 1111a at the side of the wireless power transmitter 100 and the receiving coil at the side of the wireless power receiver 200 are located adjacent to each other. Then, if the power transmission control unit 112 controls a current of the transmitting coil (Tx coil) 1111a to be changed, then the power receiving unit 291 controls power to be supplied to the wireless power receiver 200 using an electromotive force induced to the receiving coil (Rx coil) 2911a.

The efficiency of wireless power transfer by the inductive coupling method may be little affected by a frequency characteristic, but affected by an alignment and distance between the wireless power transmitter 100 and the wireless power receiver 200 including each coil.

On the other hand, in order to perform wireless power transfer in the inductive coupling method, the wireless power transmitter 100 may be configured to include an interface surface (not shown) in the form of a flat surface. One or more electronic devices may be placed at an upper portion of the interface surface, and the transmitting coil 1111a may be mounted at a lower portion of the interface surface. In this case, a vertical spacing is formed in a small-scale between the transmitting coil 1111a mounted at a lower portion of the interface surface and the receiving coil 2911a of the wireless power receiver 200 placed at an upper portion of the interface surface, and thus a distance between the coils becomes sufficiently small to efficiently implement contactless power transfer by the inductive coupling method.

Furthermore, an alignment indicator (not shown) indicating a location where the wireless power receiver 200 is to be placed at an upper portion of the interface surface. The alignment indicator indicates a location of the wireless power receiver 200 where an alignment between the transmitting coil 1111a mounted at a lower portion of the interface surface and the receiving coil 2911a can be suitably implemented. The alignment indicator may alternatively be simple marks, or may be formed in the form of a protrusion structure for guiding the location of the wireless power receiver 200. Otherwise, the alignment indicator may be formed in the form of a magnetic body such as a magnet mounted at a lower portion of the interface surface, thereby guiding the coils to be suitably arranged by mutual magnetism to a magnetic body having an opposite polarity mounted within the wireless power receiver 200.

On the other hand, the wireless power transmitter 100 may be formed to include one or more transmitting coils. The wireless power transmitter 100 may selectively use some of coils suitably arranged with the receiving coil 2911a of the wireless power receiver 200 among the one or more transmitting coils to enhance the power transmission efficiency. The wireless power transmitter 100 including the one or more transmitting coils will be described later with reference to FIG. 5.

Hereinafter, configurations of the wireless power transmitter and electronic device using an inductive coupling method applicable to the embodiments disclosed herein will be described in detail.

Wireless Power Transmitter and Electronic Device in Inductive Coupling Method

Figure 4A:
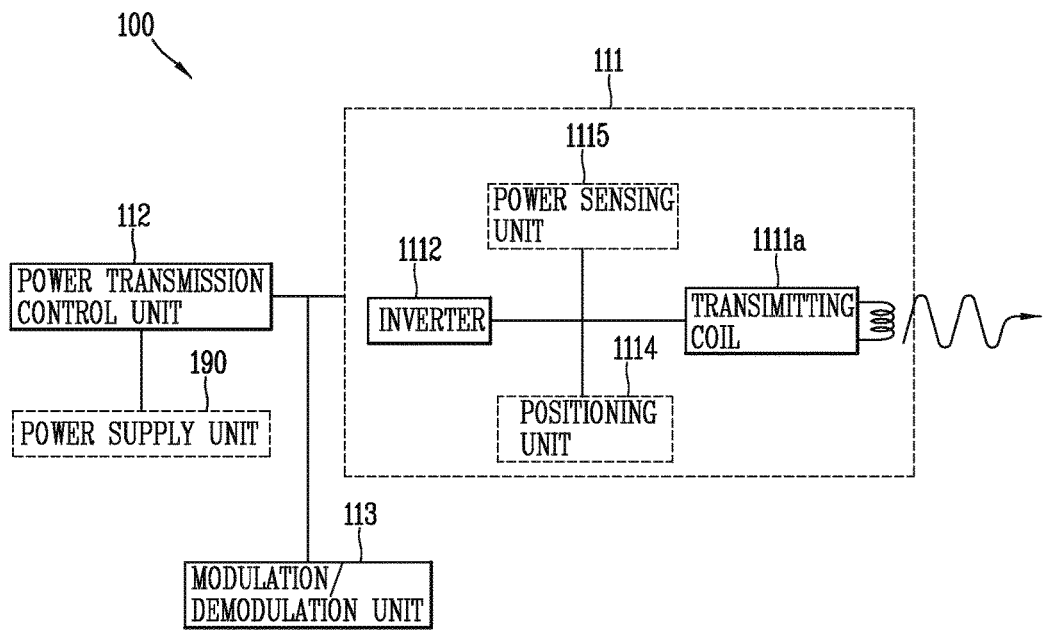
FIGS. 4A and 4B are block diagrams illustrating part of the wireless power transmitter and wireless power receiver in a magnetic induction method that can be employed in the embodiments disclosed herein.
Figure 4B:
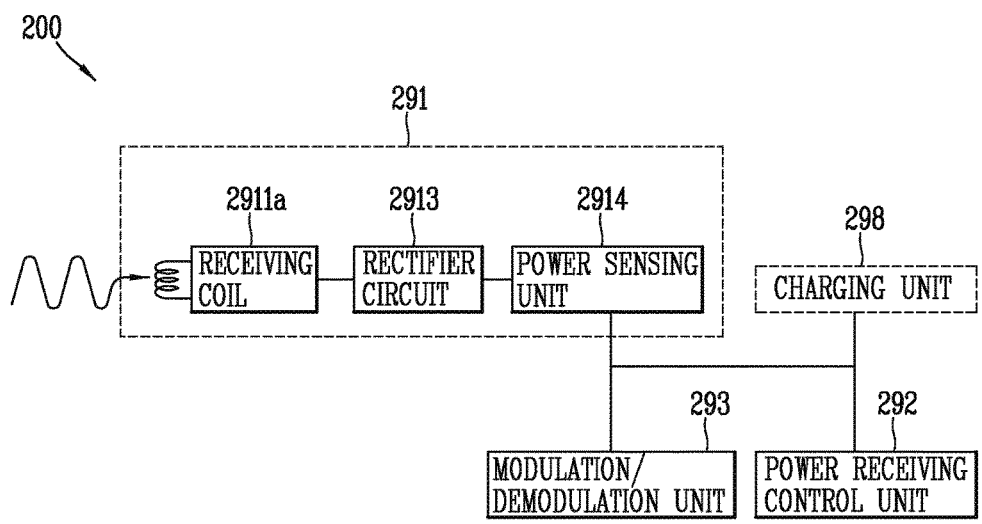

FIG. 4 is a block diagram illustrating part of the wireless power transmitter 100 and wireless power receiver 200 in a magnetic induction method that can be employed in the embodiments disclosed herein. A configuration of the power transmission unit 110 included in the wireless power transmitter 100 will be described with reference to FIG. 4A, and a configuration of the power supply unit 290 included in the wireless power receiver 200 will be described with reference to FIG. 4B.

Referring to FIG. 4A, the power conversion unit 111 of the wireless power transmitter 100 may include a transmitting (Tx) coil 1111a and an inverter 1112.

The transmitting coil 1111a may form a magnetic field corresponding to the wireless power signal according to a change of current as described above. The transmitting coil 1111a may alternatively be implemented with a planar spiral type or cylindrical solenoid type.

The inverter 1112 transforms a DC input obtained from the power supply unit 190 into an AC waveform. The AC current transformed by the inverter 1112 drives a resonant circuit including the transmitting coil 1111a and a capacitor (not shown) to form a magnetic field in the transmitting coil 1111a.

In addition, the power conversion unit 111 may further include a positioning unit 1114.

The positioning unit 1114 may move or rotate the transmitting coil 1111a to enhance the effectiveness of contactless power transfer using the inductive coupling method. As described above, it is because an alignment and distance between the wireless power transmitter 100 and the wireless power receiver 200 including a primary coil and a secondary coil may affect power transfer using the inductive coupling method. In particular, the positioning unit 1114 may be used when the wireless power receiver 200 does not exist within an active area of the wireless power transmitter 100.

Accordingly, the positioning unit 1114 may include a drive unit (not shown) for moving the transmitting coil 1111a such that a center-to-center distance of the transmitting coil 1111a of the wireless power transmitter 100 and the receiving coil 2911a of the wireless power receiver 200 is within a predetermined range, or rotating the transmitting coil 1111a such that the centers of the transmitting coil 1111a and the receiving coil 2911a are overlapped with each other.

For this purpose, the wireless power transmitter 100 may further include a detection unit (not shown) made of a sensor for detecting the location of the wireless power receiver 200, and the power transmission control unit 112 may control the positioning unit 1114 based on the location information of the wireless power receiver 200 received from the location detection sensor.

Furthermore, to this end, the power transmission control unit 112 may receive control information on an alignment or distance to the wireless power receiver 200 through the power communications modulation/demodulation unit 113, and control the positioning unit 1114 based on the received control information on the alignment or distance.

If the power conversion unit 111 is configured to include a plurality of transmitting coils, then the positioning unit 1114 may determine which one of the plurality of transmitting coils is to be used for power transmission. The configuration of the wireless power transmitter 100 including the plurality of transmitting coils will be described later with reference to FIG. 5.

On the other hand, the power conversion unit 111 may further include a power sensing unit 1115. The power sensing unit 1115 at the side of the wireless power transmitter 100 monitors a current or voltage flowing into the transmitting coil 1111a. The power sensing unit 1115 is provided to check whether or not the wireless power transmitter 100 is normally operated, and thus the power sensing unit 1115 may detect a voltage or current of the power supplied from the outside, and check whether the detected voltage or current exceeds a threshold value. The power sensing unit 1115, although not shown, may include a resistor for detecting a voltage or current of the power supplied from the outside and a comparator for comparing a voltage value or current value of the detected power with a threshold value to output the comparison result. Based on the check result of the power sensing unit 1115, the power transmission control unit 112 may control a switching unit (not shown) to cut off power applied to the transmitting coil 1111*a*.

Referring to FIG. 4B, the power supply unit 290 of the wireless power receiver 200 may include a receiving (Rx) coil 2911*a* and a rectifier 2913.

A current is induced into the receiving coil 2911*a* by a change of the magnetic field formed in the transmitting coil 1111*a*. The implementation type of the receiving coil 2911*a* may be a planar spiral type or cylindrical solenoid type similarly to the transmitting coil 1111*a*.

Furthermore, series and parallel capacitors may be configured to be connected to the receiving coil 2911*a* to enhance the effectiveness of wireless power reception or perform resonant detection.

The receiving coil 2911*a* may be in the form of a single coil or a plurality of coils.

The rectifier 2913 performs a full-wave rectification to a current to convert alternating current into direct current. The rectifier 2913, for instance, may be implemented with a full-bridge rectifier made of four diodes or a circuit using active components.

In addition, the rectifier 2913 may further include a regulator for converting a rectified current into a more flat and stable direct current. Furthermore, the output power of the rectifier 2913 is supplied to each constituent element of the power supply unit 290. Furthermore, the rectifier 2913 may further include a DC-DC converter for converting output DC power into a suitable voltage to adjust it to the power required for each constituent element (for instance, a circuit such as a charger 298).

The power communications modulation/demodulation unit 293 may be connected to the power receiving unit 291, and may be configured with a resistive element in which resistance varies with respect to direct current, and may be configured with a capacitive element in which reactance varies with respect to alternating current. The power reception control unit 292 may change the resistance or reactance of the power communications modulation/demodulation unit 293 to modulate a wireless power signal received to the power receiving unit 291.

On the other hand, the power supply unit 290 may further include a power sensing unit 2914. The power sensing unit 2914 at the side of the wireless power receiver 200 monitors a voltage and/or current of the power rectified by the rectifier 2913, and if the voltage and/or current of the rectified power exceeds a threshold value as a result of monitoring, then the power reception control unit 292 transmits a power control message to the wireless power transmitter 100 to transfer suitable power.

Wireless Power Transmitter Configured to Include One or More Transmitting Coils

Figure 5:
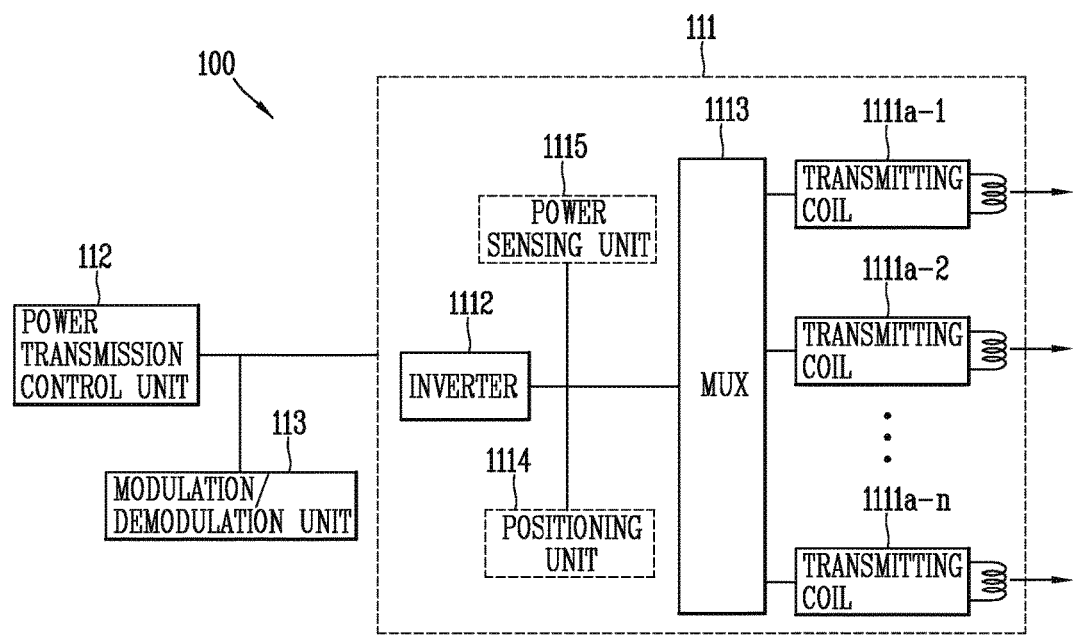
FIG. 5 is a block diagram illustrating a wireless power transmitter configured to have one or more transmitting coils receiving power according to an inductive coupling method that can be employed in the embodiments disclosed herein.

FIG. 5 is a block diagram illustrating a wireless power transmitter configured to have one or more transmission coils receiving power according to an inductive coupling method that can be employed in the embodiments disclosed herein.

Referring to FIG. 5, the power conversion unit 111 of the wireless power transmitter 100 according to the embodiments disclosed herein may include one or more transmitting coils 1111*a*-1 to 1111*a*-n. The one or more transmitting coils 1111*a*-1 to 1111*a*-n may be an array of partly overlapping primary coils. An active area may be determined by some of the one or more transmitting coils.

The one or more transmitting coils 1111*a*-1 to 1111*a*-n may be mounted at a lower portion of the interface surface. Furthermore, the power conversion unit 111 may further include a multiplexer 1113 for establishing and releasing the connection of some of the one or more transmitting coils 1111*a*-1 to 1111*a*-n.

Upon detecting the location of the wireless power receiver 200 placed at an upper portion of the interface surface, the power transmission control unit 112 may take the detected location of the wireless power receiver 200 into consideration to control the multiplexer 1113, thereby allowing coils that can be placed in an inductive coupling relation to the receiving coil 2911*a* of the wireless power receiver 200 among the one or more transmitting coils 1111*a*-1 to 1111*a*-n to be connected to one another.

For this purpose, the power transmission control unit 112 may acquire the location information of the wireless power receiver 200. For example, the power transmission control unit 112 may acquire the location of the wireless power receiver 200 on the interface surface by the location detection unit (not shown) provided in the wireless power transmitter 100. For another example, the power transmission control unit 112 may alternatively receive a power control message indicating a strength of the wireless power signal from an object on the interface surface or a power control message indicating the identification information of the object using the one or more transmitting coils 1111*a*-1 to 1111*a*-n, respectively, and determines whether it is located adjacent to which one of the one or more transmitting coils based on the received result, thereby acquiring the location information of the wireless power receiver 200.

On the other hand, the active area as part of the interface surface may denote a portion through which a magnetic field with a high efficiency can pass when the wireless power transmitter 100 transfers power to the wireless power receiver 200 in a wireless manner. At this time, a single transmitting coil or one or a combination of more transmitting coils forming a magnetic field passing through the active area may be designated as a primary cell. Accordingly, the power transmission control unit 112 may determine an active area based on the detected location of the wireless power receiver 200, and establish the connection of a primary cell corresponding to the active area to control the multiplexer 1113, thereby allowing the receiving coil 2911*a* of the wireless power receiver 200 and the coils belonging to the primary cell to be placed in an inductive coupling relation.

Furthermore, the power conversion unit 111 may further include an impedance matching unit (not shown) for controlling an impedance to form a resonant circuit with the coils connected thereto.

Hereinafter, a method for allowing a wireless power transmitter to transfer power according to a resonance coupling method will be disclosed with reference to FIGS. 6 through 8.

Resonance Coupling Method

Figure 6:
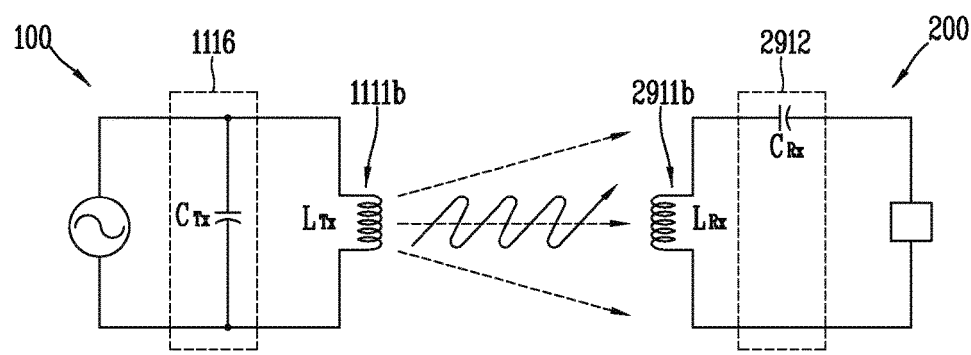
FIG. 6 is a view illustrating a concept in which power is transferred to a wireless power receiver from a wireless power transmitter in a wireless manner according to a resonance coupling method.

FIG. 6 is a view illustrating a concept in which power is transferred to an electronic device from a wireless power transmitter in a wireless manner according to a resonance coupling method.

First, resonance will be described in brief as follows. Resonance refers to a phenomenon in which amplitude of vibration is remarkably increased when periodically receiving an external force having the same frequency as the natural frequency of a vibration system. Resonance is a phenomenon occurring at all kinds of vibrations such as mechanical vibration, electric vibration, and the like. Generally, when exerting a vibratory force to a vibration system from the outside, if the natural frequency thereof is the same as a frequency of the externally applied force, then the vibration becomes strong, thus increasing the width.

With the same principle, when a plurality of vibrating bodies separated from one another within a predetermined distance vibrate at the same frequency, the plurality of vibrating bodies resonate with one another, and in this case, resulting in a reduced resistance between the plurality of vibrating bodies. In an electrical circuit, a resonant circuit can be made by using an inductor and a capacitor.

When the wireless power transmitter 100 transfers power according to the inductive coupling method, a magnetic field having a specific vibration frequency is formed by alternating current power in the power transmission unit 110. If a resonance phenomenon occurs in the wireless power receiver 200 by the formed magnetic field, then power is generated by the resonance phenomenon in the wireless power receiver 200.

The resonant frequency may be determined by the following formula in Equation 1.

$$f = \frac{1}{2\pi\sqrt{LC}} \quad \text{[Equation 1]}$$

Here, the resonant frequency (f) is determined by an inductance (L) and a capacitance (C) in a circuit. In a circuit forming a magnetic field using a coil, the inductance can be determined by a number of turns of the coil, and the like, and the capacitance can be determined by a gap between the coils, an area, and the like. In addition to the coil, a capacitive resonant circuit may be configured to be connected thereto to determine the resonant frequency.

Referring to FIG. 6, when power is transmitted in a wireless manner according to the resonance coupling method, the power conversion unit 111 of the wireless power transmitter 100 may include a transmitting (Tx) coil 1111b in which a magnetic field is formed and a resonant circuit 1116 connected to the transmitting coil 1111b to determine a specific vibration frequency. The resonant circuit 1116 may be implemented by using a capacitive circuit (capacitors), and the specific vibration frequency may be determined based on an inductance of the transmitting coil 1111b and a capacitance of the resonant circuit 1116.

The configuration of a circuit element of the resonant circuit 1116 may be implemented in various forms such that the power conversion unit 111 forms a magnetic field, and is not limited to a form of being connected in parallel to the transmitting coil 1111b as illustrated in FIG. 6.

Furthermore, the power receiving unit 291 of the wireless power receiver 200 may include a resonant circuit 2912 and a receiving (Rx) coil 2911b to generate a resonance phenomenon by a magnetic field formed in the wireless power transmitter 100. In other words, the resonant circuit 2912 may be also implemented by using a capacitive circuit, and the resonant circuit 2912 is configured such that a resonant frequency determined based on an inductance of the receiving coil 2911b and a capacitance of the resonant circuit 2912 has the same frequency as a resonant frequency of the formed magnetic field.

The configuration of a circuit element of the resonant circuit 2912 may be implemented in various forms such that the power receiving unit 291 generates resonance by a magnetic field, and is not limited to a form of being connected in series to the receiving coil 2911b as illustrated in FIG. 6.

The specific vibration frequency in the wireless power transmitter 100 may have $L_{TX}$, $C_{TX}$, and may be acquired by using the Equation 1. Here, the wireless power receiver 200 generates resonance when a result of substituting the $L_{RX}$ and $C_{RX}$ of the wireless power receiver 200 to the Equation 1 is same as the specific vibration frequency.

According to a contactless power transfer method by resonance coupling, when the wireless power transmitter 100 and wireless power receiver 200 resonate at the same frequency, respectively, an electromagnetic wave is propagated through a short-range magnetic field, and thus there exists no energy transfer between the devices if they have different frequencies.

As a result, an efficiency of contactless power transfer by the resonance coupling method is greatly affected by a frequency characteristic, whereas the effect of an alignment and distance between the wireless power transmitter 100 and the wireless power receiver 200 including each coil is relatively smaller than the inductive coupling method.

Hereinafter, the configuration of a wireless power transmitter and an electronic device in the resonance coupling method applicable to the embodiments disclosed herein will be described in detail.

Wireless Power Transmitter in Resonance Coupling Method

FIG. 7 is a block diagram illustrating part of the wireless power transmitter 100 and wireless power receiver 200 in a resonance method that can be employed in the embodiments disclosed herein.

Figure 7A:
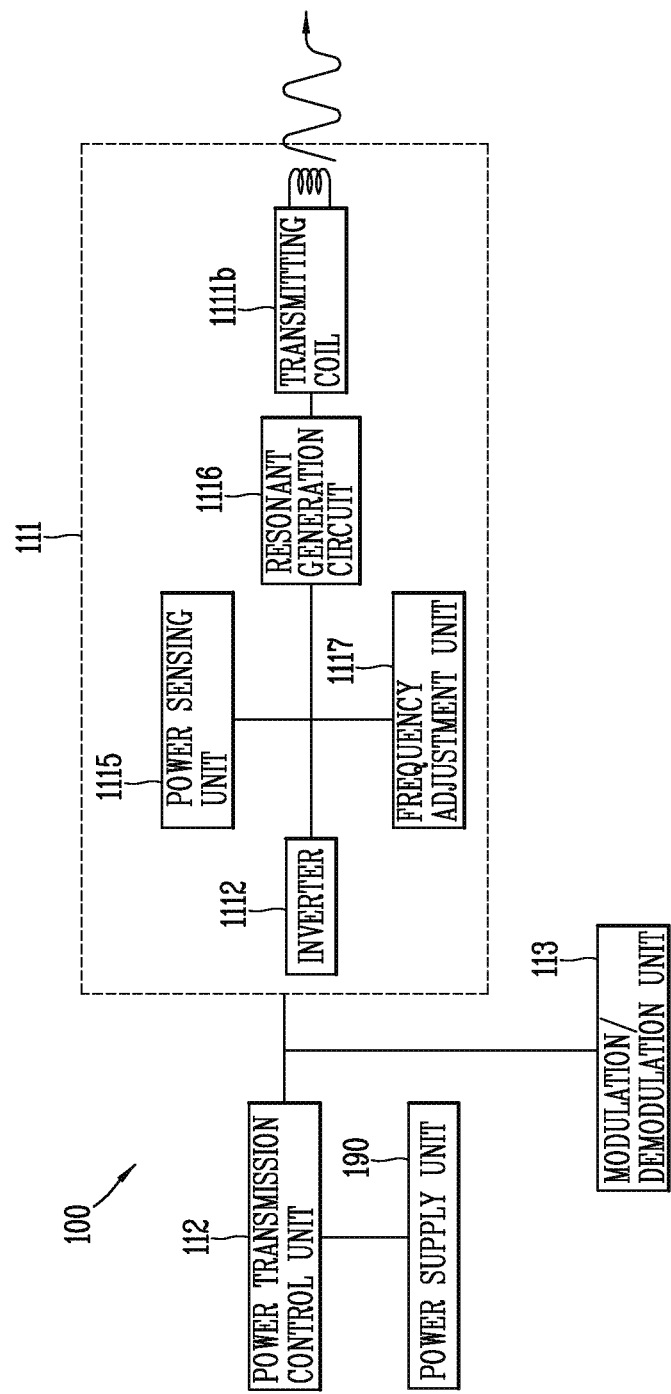
FIGS. 7A and 7B are block diagrams illustrating part of the wireless power transmitter and wireless power receiver in a resonance method that can be employed in the embodiments disclosed herein.

A configuration of the power transmission unit 110 included in the wireless power transmitter 100 will be described with reference to FIG. 7A.

The power conversion unit 111 of the wireless power transmitter 100 may include a transmitting (Tx) coil 1111b, an inverter 1112, and a resonant circuit 1116. The inverter 1112 may be configured to be connected to the transmitting coil 1111b and the resonant circuit 1116.

The transmitting coil 1111b may be mounted separately from the transmitting coil 1111a for transferring power according to the inductive coupling method, but may transfer power in the inductive coupling method and resonance coupling method using one single coil.

The transmitting coil 1111b, as described above, forms a magnetic field for transferring power. The transmitting coil 1111b and the resonant circuit 1116 generate resonance when alternating current power is applied thereto, and at this time, a vibration frequency may be determined based on an inductance of the transmitting coil 1111b and a capacitance of the resonant circuit 1116.

For this purpose, the inverter 1112 transforms a DC input obtained from the power supply unit 190 into an AC waveform, and the transformed AC current is applied to the transmitting coil 1111b and the resonant circuit 1116.

In addition, the power conversion unit 111 may further include a frequency adjustment unit 1117 for changing a resonant frequency of the power conversion unit 111. The resonant frequency of the power conversion unit 111 is determined based on an inductance and/or capacitance within a circuit constituting the power conversion unit 111 by Equation 1, and thus the power transmission control unit 112 may determine the resonant frequency of the power conversion unit 111 by controlling the frequency adjustment unit 1117 to change the inductance and/or capacitance.

The frequency adjustment unit 1117, for example, may be configured to include a motor for adjusting a distance between capacitors included in the resonant circuit 1116 to change a capacitance, or include a motor for adjusting a number of turns or diameter of the transmitting coil 1111*b* to change an inductance, or include active elements for determining the capacitance and/or inductance On the other hand, the power conversion unit 111 may further include a power sensing unit 1115. The operation of the power sensing unit 1115 is the same as the foregoing description.

Figure 7B:
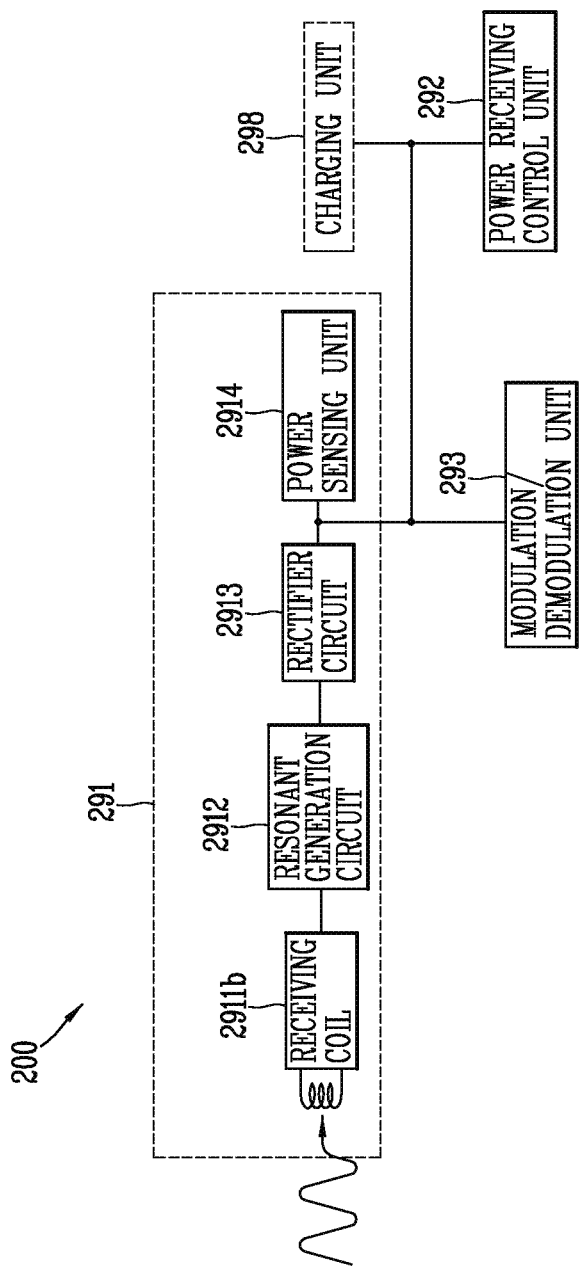

Referring to FIG. 7B, a configuration of the power supply unit 290 included in the wireless power receiver 200 will be described. The power supply unit 290, as described above, may include the receiving (Rx) coil 2911*b* and resonant circuit 2912.

In addition, the power receiving unit 291 of the power supply unit 290 may further include a rectifier 2913 for converting an AC current generated by resonance phenomenon into DC. The rectifier 2913 may be configured similarly to the foregoing description.

Furthermore, the power receiving unit 291 may further include a power sensing unit 2914 for monitoring a voltage and/or current of the rectified power. The power sensing unit 2914 may be configured similarly to the foregoing description.

Wireless Power Transmitter Configured to Include One or More Transmitting Coils

Figure 8:
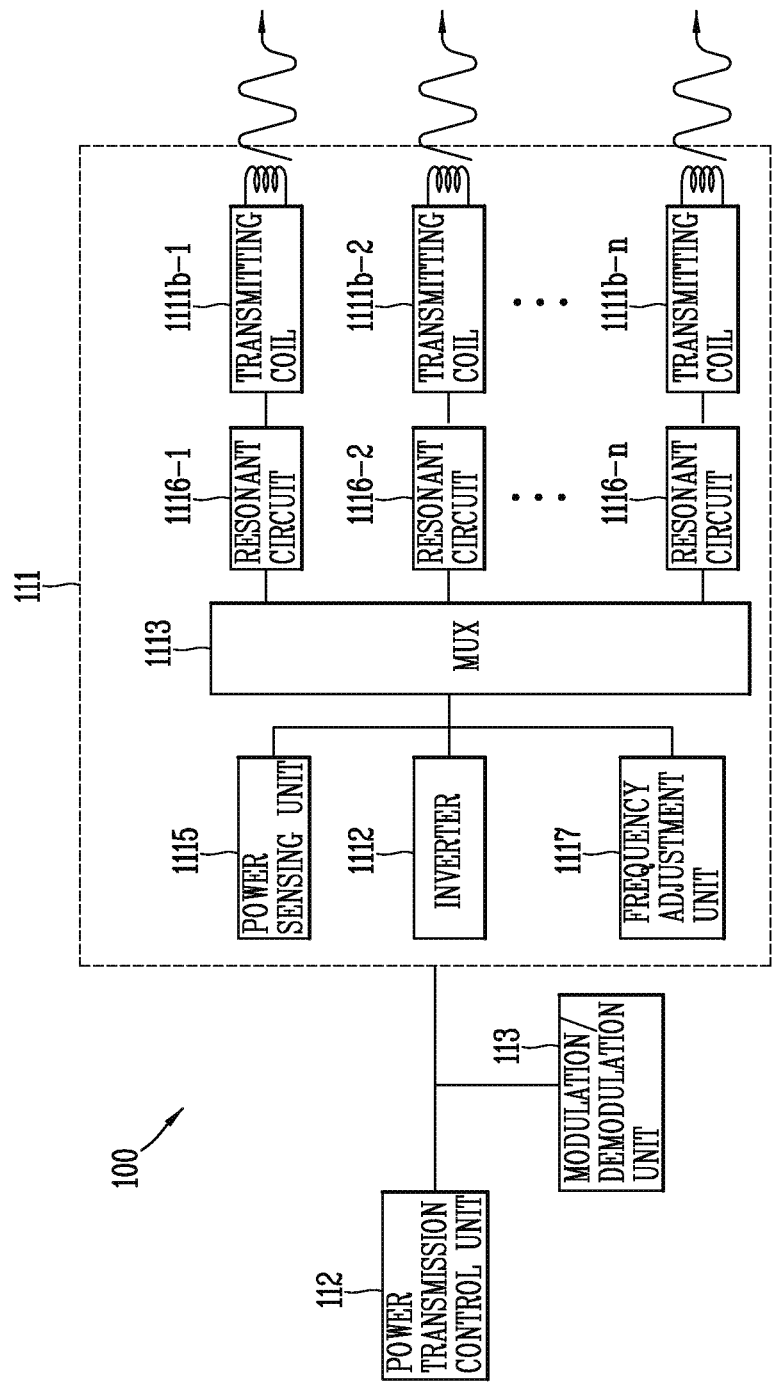
FIG. 8 is a block diagram illustrating a wireless power transmitter configured to have one or more transmitting coils receiving power according to a resonance coupling method that can be employed in the embodiments disclosed herein.

FIG. 8 is a block diagram illustrating a wireless power transmitter configured to have one or more transmission coils receiving power according to a resonance coupling method that can be employed in the embodiments disclosed herein.

Referring to FIG. 8, the power conversion unit 111 of the wireless power transmitter 100 according to the embodiments disclosed herein may include one or more transmitting coils 1111*b*-1 to 1111*b*-n and resonant circuits (1116-1 to 1116-n) connected to each transmitting coils. Furthermore, the power conversion unit 111 may further include a multiplexer 1113 for establishing and releasing the connection of some of the one or more transmitting coils 1111*b*-1 to 1111*b*-n.

The one or more transmitting coils 1111*b*-1 to 1111*b*-n may be configured to have the same vibration frequency, or some of them may be configured to have different vibration frequencies. It is determined by an inductance and/or capacitance of the resonant circuits (1116-1 to 1116-n) connected to the one or more transmitting coils 1111*b*-1 to 1111*b*-n, respectively.

For this purpose, the frequency adjustment unit 1117 may be configured to change an inductance and/or capacitance of the resonant circuits (1116-1 to 1116-n) connected to the one or more transmitting coils 1111*b*-1 to 1111*b*-n, respectively.

In-Band Communication

Figure 9:
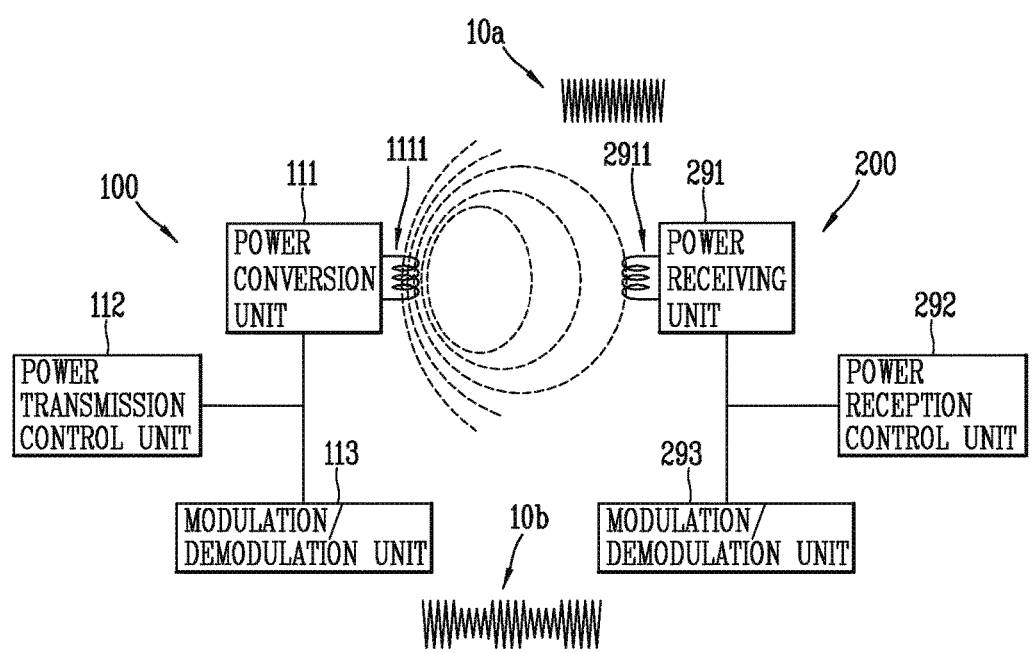
FIG. 9 a view illustrating a concept of transmitting and receiving a packet between a wireless power transmitter and an electronic device through the modulation and demodulation of a wireless power signal in transferring power in a wireless manner according to the embodiments disclosed herein.

FIG. 9 a view illustrating the concept of transmitting and receiving a packet between a wireless power transmitter and a wireless power receiver through the modulation and demodulation of a wireless power signal in transferring power in a wireless manner disclosed herein.

As illustrated in FIG. 9, the power conversion unit 111 included in the wireless power transmitter 100 may generate a wireless power signal. The wireless power signal may be generated through the transmitting coil 1111 included in the power conversion unit 111.

The wireless power signal 10*a* generated by the power conversion unit 111 may arrive at the wireless power receiver 200 so as to be received through the power receiving unit 291 of the wireless power receiver 200. The generated wireless power signal may be received through the receiving coil 2911 included in the power receiving unit 291.

The power reception control unit 292 may control the modulation/demodulation unit 293 connected to the power receiving unit 291 to modulate the wireless power signal while the wireless power receiver 200 receives the wireless power signal. When the received wireless power signal is modulated, the wireless power signal may form a closed-loop within a magnetic field or an electro-magnetic field. This may allow the wireless power transmitter 100 to sense a modulated wireless power signal 10*b*. The modulation/demodulation unit 113 may demodulate the sensed wireless power signal and decode the packet from the demodulated wireless power signal.

The modulation method employed for the communication between the wireless power transmitter 100 and the wireless power receiver 200 may be an amplitude modulation. As aforementioned, the amplitude modulation is a backscatter modulation may be a backscatter modulation method in which the power communications modulation/demodulation unit 293 at the side of the wireless power receiver 200 changes an amplitude of the wireless power signal 10*a* formed by the power conversion unit 111 and the power reception control unit 292 at the side of the wireless power transmitter 100 detects an amplitude of the modulated wireless power signal 10*b*.

Modulation and Demodulation of Wireless Power Signal

Hereinafter, description will be given of modulation and demodulation of a packet, which is transmitted or received between the wireless power transmitter 100 and the wireless power receiver 200 with reference to FIGS. 10 and 11.

Figure 10:
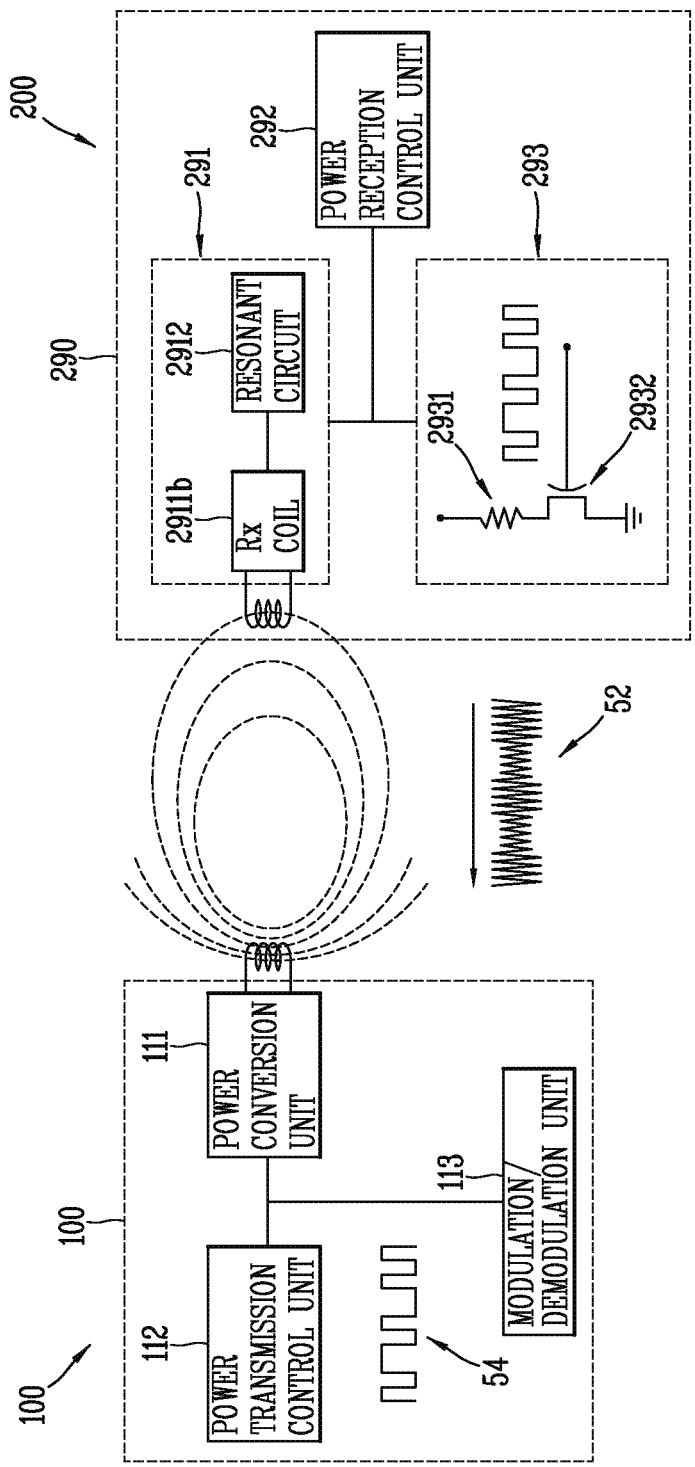
FIG. 10 is a view illustrating a configuration of transmitting and receiving a power control message in transferring power in a wireless manner according to the embodiments disclosed herein.
Figure 11A:
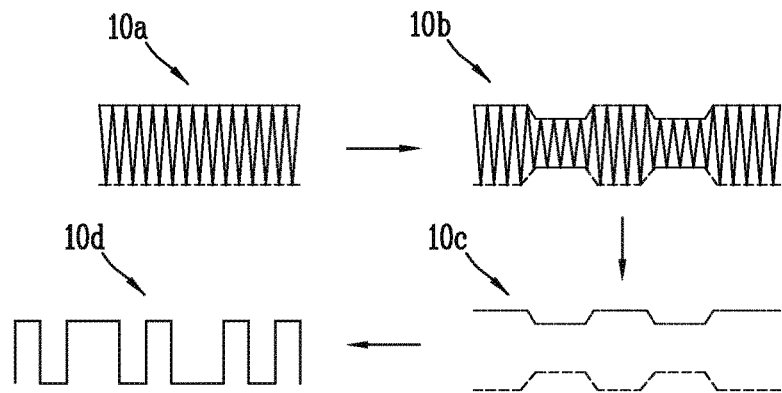
FIGS. 11A, 11B and 11C illustrate signal forms in modulation and demodulation executed in a wireless power transfer according to the embodiments disclosed herein.
Figure 11B:
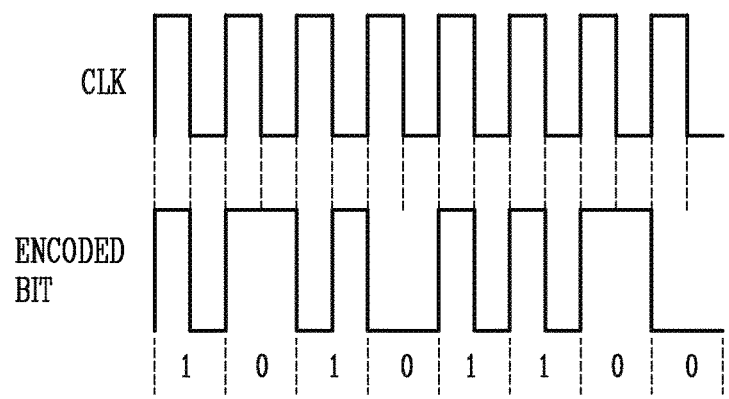
Figure 11C:
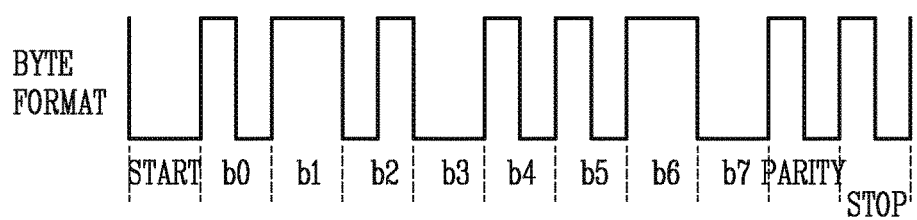

FIG. 10 is a view illustrating a configuration of transmitting or receiving a power control message in transferring power in a wireless manner disclosed herein, and FIG. 11 is a view illustrating forms of signals upon modulation and demodulation executed in the wireless power transfer disclosed herein.

Referring to FIG. 10, the wireless power signal received through the power receiving unit 291 of the wireless power receiver 200, as illustrated in FIG. 11A, may be a non-modulated wireless power signal 51. The wireless power receiver 200 and the wireless power transmitter 100 may establish a resonance coupling according to a resonant frequency, which is set by the resonant circuit 2912 within the power receiving unit 291, and the wireless power signal 51 may be received through the receiving coil 2911*b*.

The power reception control unit 292 may modulate the wireless power signal 51 received through the power receiving unit 291 by changing a load impedance within the modulation/demodulation unit 293. The modulation/demodulation unit 293 may include a passive element 2931 and an active element 2932 for modulating the wireless power signal 51. The modulation/demodulation unit 293 may modulate the wireless power signal 51 to include a packet, which is desired to be transmitted to the wireless power transmitter 100. Here, the packet may be input into the active element 2932 within the modulation/demodulation unit 293.

Afterwards, the power transmission control unit 112 of the wireless power transmitter 100 may demodulate a modulated wireless power signal 52 through an envelop detection, and decode the detected signal 53 into digital data 54. The demodulation may detect a current or voltage flowing into the power conversion unit 111 to be classified into two states, a HI phase and a LO phase, and acquire a packet to be transmitted by the wireless power receiver 200 based on digital data classified according to the states.

Hereinafter, a process of allowing the wireless power transmitter 100 to acquire a power control message to be transmitted by the wireless power receiver 200 from the demodulated digital data will be described.

Referring to FIG. 11B, the power transmission control unit 112 detects an encoded bit using a clock signal (CLK) from an envelope detected signal. The detected encoded bit is encoded according to a bit encoding method used in the modulation process at the side of the wireless power receiver 200. The bit encoding method may correspond to any one of non-return to zero (NRZ) and bi-phase encoding.

For instance, the detected bit may be a differential bi-phase (DBP) encoded bit. According to the DBP encoding, the power reception control unit 292 at the side of the wireless power receiver 200 is allowed to have two state transitions to encode data bit 1, and to have one state transition to encode data bit 0. In other words, data bit 1 may be encoded in such a manner that a transition between the HI state and LO state is generated at a rising edge and falling edge of the clock signal, and data bit 0 may be encoded in such a manner that a transition between the HI state and LO state is generated at a rising edge of the clock signal.

On the other hand, the power transmission control unit 112 may acquire data in a byte unit using a byte format constituting a packet from a bit string detected according to the bit encoding method. For instance, the detected bit string may be transferred by using an 11-bit asynchronous serial format as illustrated in FIG. 12C. In other words, the detected bit may include a start bit indicating the beginning of a byte and a stop bit indicating the end of a byte, and also include data bits (b0 to b7) between the start bit and the stop bit. Furthermore, it may further include a parity bit for checking an error of data. The data in a byte unit constitutes a packet including a power control message.

[For Supporting In-band Two-way Communication]

As aforementioned, FIG. 9 has illustrated that the wireless power receiver 200 transmits a packet using a carrier signal 10a formed by the wireless power transmitter 100. However, the wireless power transmitter 100 may also transmit data to the wireless power receiver 200 by a similar method.

That is, the power transmission control unit 112 may control the modulation/demodulation unit 113 to modulate data, which is to be transmitted to the wireless power receiver 200, such that the data can be included in the carrier signal 10a. Here, the power reception control unit 292 of the wireless power receiver 200 may control the modulation/demodulation unit 293 to execute demodulation so as to acquire data from the modulated carrier signal 10a.

Packet Format

Hereinafter, description will be given of a structure of a packet used in communication using a wireless power signal according to the exemplary embodiments disclosed herein.

FIG. 12 is a view illustrating a packet including a power control message used in a contactless (wireless) power transfer method according to the embodiments disclosed herein.

Figure 12A:
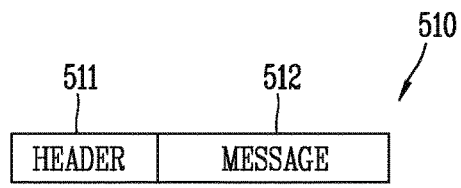
FIGS. 12A, 12B and 12C illustrate a packet including a power control message used in a wireless power transfer method according to the embodiments disclosed herein.

As illustrated in FIG. 12A, the wireless power transmitter 100 and the wireless power receiver 200 may transmit and receive data desired to transmit in a form of a command packet (command_packet) 510. The command packet 510 may include a header 511 and a message 512.

The header 511 may include a field indicating a type of data included in the message 512. Size and type of the message may be decided based on a value of the field which indicates the type of data.

The header 511 may include an address field for identifying a transmitter (originator) of the packet. For example, the address field may indicate an identifier of the wireless power receiver 200 or an identifier of a group to which the wireless power receiver 200 belongs. When the wireless power receiver 200 transmits the packet 510, the wireless power receiver 200 may generate the packet 510 such that the address field can indicate identification information related to the receiver 200 itself.

The message 512 may include data that the originator of the packet 510 desires to transmit. The data included in the message 512 may be a report, a request or a response for the other party.

Figure 12B:
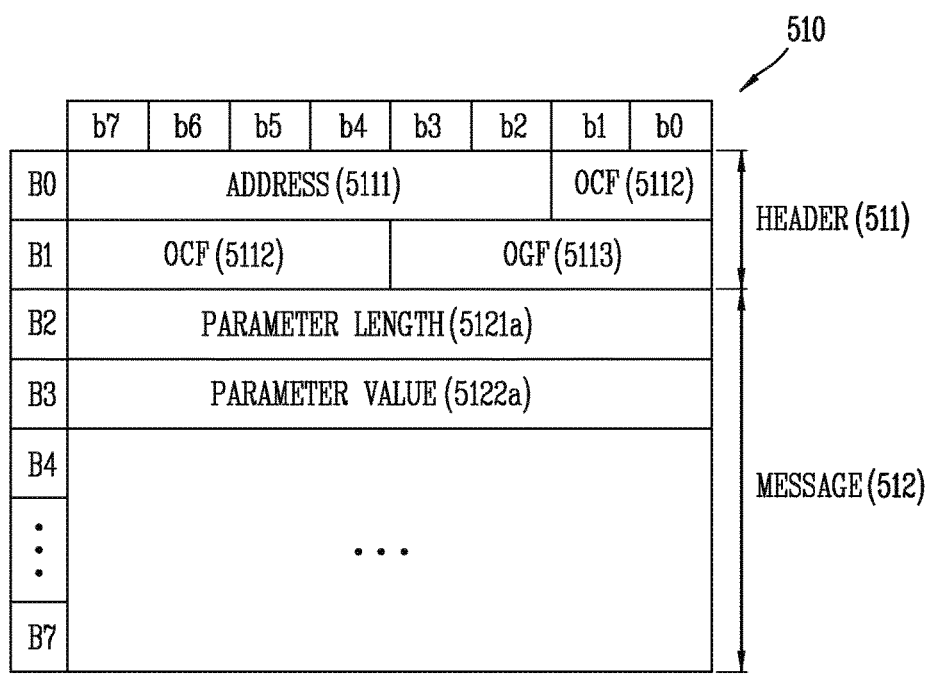
Figure 12C:
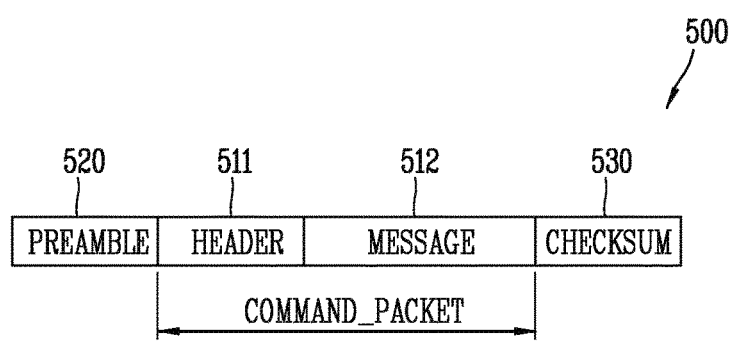

According to one exemplary embodiment, the command packet 510 may be configured as illustrated in FIG. 12B. The header 511 included in the command packet 510 may be represented with a predetermined size. For example, the header 511 may have a 2-byte size.

The header 511 may include a reception address field. For example, the reception address field may have a 6-bit size.

The header 511 may include an operation command field (OCF) or an operation group field (OGF). The OGF is a value given for each group of commands for the wireless power receiver 200, and the OCF is a value given for each command existing in each group in which the wireless power receiver 200 is included.

The message 512 may be divided into a length field 5121 of a parameter and a value field 5122 of the parameter. That is, the originator of the packet 510 may generate the message by a length-value pair (5121a-5122a, etc.) of at least one parameter, which is required to represent data desired to transmit.

Referring to FIG. 12C, the wireless power transmitter 100 and the wireless power receiver 200 may transmit and receive the data in a form of a packet which further has a preamble 520 and a checksum 530 added to the command packet 510.

The preamble 520 may be used to perform synchronization with data received by the wireless power transmitter 100 and detect the start bit of the header 520. The preamble 520 may be configured to repeat the same bit. For instance, the preamble 520 may be configured such that data bit 1 according to the DBP encoding is repeated eleven to twenty five times.

The checksum 530 may be used to detect an error that can be occurred in the command packet 510 while transmitting a power control message.

Operation Phases

Hereinafter, description will be given of operation phases of the wireless power transmitter 100 and the wireless power receiver 200.

Figure 13:
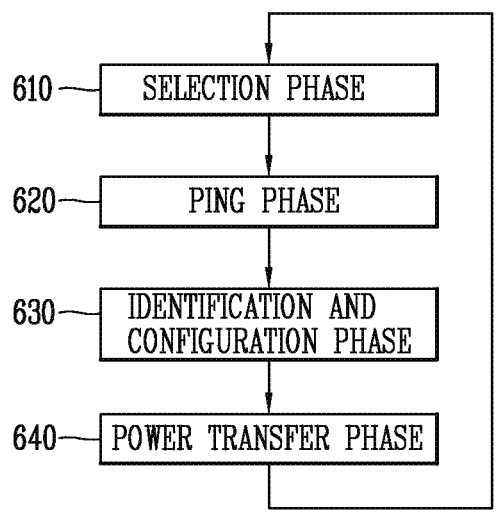
FIG. 13 is a view illustrating operation phases of the wireless power transmitter and wireless power receiver according to the embodiments disclosed herein.
Figure 14:
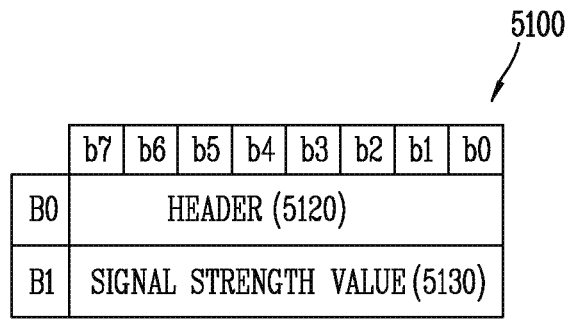
FIGS. 14 to 18 are views illustrating the structure of packets including a power control message between the wireless power transmitter 100 and the wireless power receiver.

FIG. 13 illustrates the operation phases of the wireless power transmitter 100 and the wireless power receiver 200 according to the embodiments disclosed herein. Furthermore, FIGS. 14 to 18 illustrate the structures of packets including a power control message between the wireless power transmitter 100 and the wireless power receiver 200.

Referring to FIG. 13, the operation phases of the wireless power transmitter 100 and the wireless power receiver 200 for wireless power transfer may be divided into a selection phase (state) 610, a ping phase 620, an identification and configuration phase 630, and a power transfer phase 640.

The wireless power transmitter 100 detects whether or not objects exist within a range that the wireless power transmitter 100 can transmit power in a wireless manner in the selection state 610, and the wireless power transmitter 100 sends a detection signal to the detected object and the wireless power receiver 200 sends a response to the detection signal in the ping state 620.

Furthermore, the wireless power transmitter 100 identifies the wireless power receiver 200 selected through the previous states and acquires configuration information for power transmission in the identification and configuration state 630. The wireless power transmitter 100 transmits power to the wireless power receiver 200 while controlling power transmitted in response to a control message received from the wireless power receiver 200 in the power transfer state 640.

Hereinafter, each of the operation phases will be described in detail.

1) Selection State

The wireless power transmitter 100 in the selection state 610 performs a detection process to select the wireless power receiver 200 existing within a detection area. The detection area, as described above, refers to a region in which an object within the relevant area can affect on the characteristic of the power of the power conversion unit 111. Compared to the ping state 620, the detection process for selecting the wireless power receiver 200 in the selection state 610 is a process of detecting a change of the power amount for forming a wireless power signal in the power conversion unit at the side of the wireless power transmitter 100 to check whether any object exists within a predetermined range, instead of the scheme of receiving a response from the wireless power receiver 200 using a power control message. The detection process in the selection state 610 may be referred to as an analog ping process in the aspect of detecting an object using a wireless power signal without using a packet in a digital format in the ping state 620 which will be described later.

The wireless power transmitter 100 in the selection state 610 can detect that an object comes in or out within the detection area. Furthermore, the wireless power transmitter 100 can distinguish the wireless power receiver 200 capable of transferring power in a wireless manner from other objects (for example, a key, a coin, etc.) among objects located within the detection area.

As described above, a distance that can transmit power in a wireless manner may be different according to the inductive coupling method and resonance coupling method, and thus the detection area for detecting an object in the selection state 610 may be different from one another.

First, in case where power is transmitted according to the inductive coupling method, the wireless power transmitter 100 in the selection state 610 can monitor an interface surface (not shown) to detect the alignment and removal of objects.

Furthermore, the wireless power transmitter 100 may detect the location of the wireless power receiver 200 placed on an upper portion of the interface surface. As described above, the wireless power transmitter 100 formed to include one or more transmitting coils may perform the process of entering the ping state 620 in the selection state 610, and checking whether or not a response to the detection signal is transmitted from the object using each coil in the ping state 620 or subsequently entering the identification state 630 to check whether identification information is transmitted from the object. The wireless power transmitter 100 may determine a coil to be used for contactless power transfer based on the detected location of the wireless power receiver 200 acquired through the foregoing process.

Furthermore, when power is transmitted according to the resonance coupling method, the wireless power transmitter 100 in the selection state 610 can detect an object by detecting that any one of a frequency, a current and a voltage of the power conversion unit is changed due to an object located within the detection area.

On the other hand, the wireless power transmitter 100 in the selection state 610 may detect an object by at least any one of the detection methods using the inductive coupling method and resonance coupling method. The wireless power transmitter 100 may perform an object detection process according to each power transmission method, and subsequently select a method of detecting the object from the coupling methods for contactless power transfer to advance to other states 620, 630, 640.

On the other hand, for the wireless power transmitter 100, a wireless power signal formed to detect an object in the selection state 610 and a wireless power signal formed to perform digital detection, identification, configuration and power transmission in the subsequent states 620, 630, 640 may have a different characteristic in the frequency, strength, and the like. It is because the selection state 610 of the wireless power transmitter 100 corresponds to an idle state for detecting an object, thereby allowing the wireless power transmitter 100 to reduce consumption power in the idle state or generate a specialized signal for effectively detecting an object.

2) Ping State

The wireless power transmitter 100 in the ping state 620 performs a process of detecting the wireless power receiver 200 existing within the detection area through a power control message. Compared to the detection process of the wireless power receiver 200 using a characteristic of the wireless power signal and the like in the selection state 610, the detection process in the ping state 620 may be referred to as a digital ping process.

The wireless power transmitter 100 in the ping state 620 forms a wireless power signal to detect the wireless power receiver 200, modulates the wireless power signal modulated by the wireless power receiver 200, and acquires a power control message in a digital data format corresponding to a response to the detection signal from the modulated wireless power signal. The wireless power transmitter 100 may receive a power control message corresponding to the response to the detection signal to recognize the wireless power receiver 200 which is a subject of power transmission.

The detection signal formed to allowing the wireless power transmitter 100 in the ping state 620 to perform a digital detection process may be a wireless power signal formed by applying a power signal at a specific operating point for a predetermined period of time. The operating point may denote a frequency, duty cycle, and amplitude of the voltage applied to the transmitting (Tx) coil. The wireless power transmitter 100 may generate the detection signal generated by applying the power signal at a specific operating point for a predetermined period of time, and attempt to receive a power control message from the wireless power receiver 200.

Figure 15A:
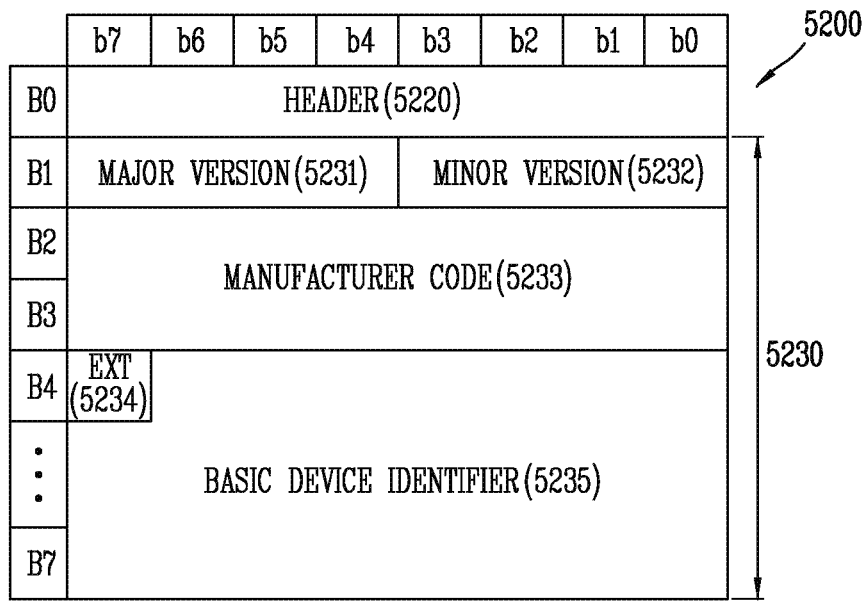
Figure 15B:
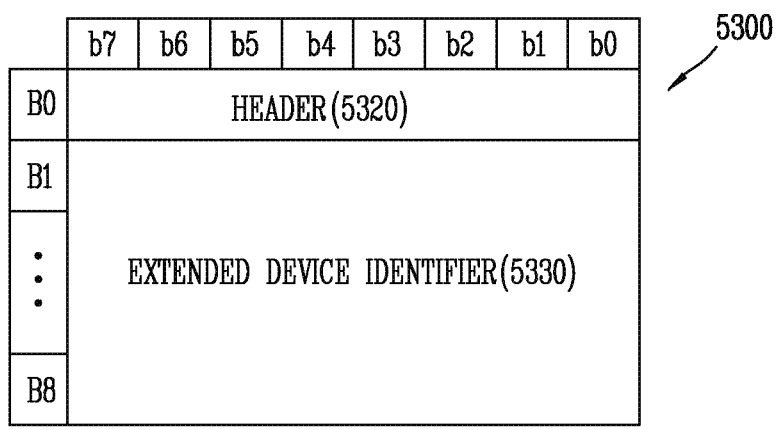

On the other hand, the power control message corresponding to a response to the detection signal may be a message indicating strength of the wireless power signal received by the wireless power receiver 200. For example, the wireless power receiver 200 may transmit a signal strength packet 5100 including a message indicating the received strength of the wireless power signal as a response to the detection signal as illustrated in FIG. 15. The packet 5100 may include a header 5120 for notifying a packet indicating the signal strength and a message 5130 indicating strength of the power signal received by the wireless power receiver 200. The strength of the power signal within the message 5130 may be a value indicating a degree of inductive coupling or resonance coupling for power transmission between the wireless power transmitter 100 and the wireless power receiver 200.

The wireless power transmitter 100 may receive a response message to the detection signal to find the wireless power receiver 200, and then extend the digital detection process to enter the identification and configuration state 630. In other words, the wireless power transmitter 100 maintains the power signal at a specific operating point subsequent to finding the wireless power receiver 200 to receive a power control message required in the identification and configuration state 630.

However, if the wireless power transmitter 100 is not able to find the wireless power receiver 200 to which power can be transferred, then the operation phase of the wireless power transmitter 100 will be returned to the selection state 610.

3) Identification and Configuration State

The wireless power transmitter 100 in the identification and configuration state 630 may receive identification information and/or configuration information transmitted by the wireless power receiver 200, thereby controlling power transmission to be effectively carried out.

The wireless power receiver 200 in the identification and configuration state 630 may transmit a power control message including its own identification information. For this purpose, the wireless power receiver 200, for instance, may transmit an identification packet 5200 including a message indicating the identification information of the wireless power receiver 200 as illustrated in FIG. 16A. The packet 5200 may include a header 5220 for notifying a packet indicating identification information and a message 5230 including the identification information of the electronic device. The message 5230 may include information (2531 and 5232) indicating a version of the contract for contactless power transfer, information 5233 for identifying a manufacturer of the wireless power receiver 200, information 5234 indicating the presence or absence of an extended device identifier, and a basic device identifier 5235. Furthermore, if it is displayed that an extended device identifier exists in the information 5234 indicating the presence or absence of an extended device identifier, then an extended identification packet 5300 including the extended device identifier as illustrated in FIG. 16B will be transmitted in a separate manner. The packet 5300 may include a header 5320 for notifying a packet indicating an extended device identifier and a message 5330 including the extended device identifier. When the extended device identifier is used as described above, information based on the manufacturer's identification information 5233, the basic device identifier 5235 and the extended device identifier 5330 will be used to identify the wireless power receiver 200.

Figure 17:
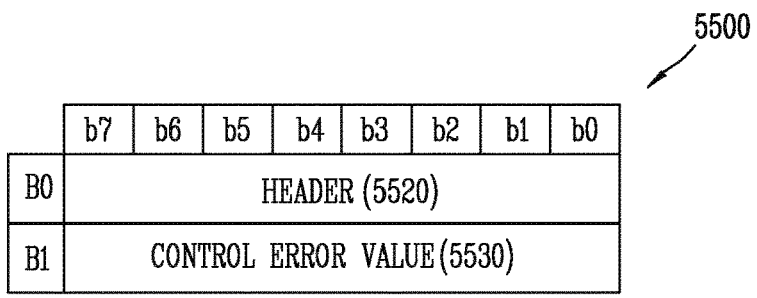

The wireless power receiver 200 may transmit a power control message including information on expected maximum power in the identification and configuration state 630. To this end, the wireless power receiver 200, for instance, may transmit a configuration packet 5400 as illustrated in FIG. 17. The packet may include a header 5420 for notifying that it is a configuration packet and a message 5430 including information on the expected maximum power. The message 5430 may include power class 5431, information 5432 on expected maximum power, an indicator 5433 indicating a method of determining a current of a main cell at the side of the wireless power transmitter, and the number 5434 of optional configuration packets. The indicator 5433 may indicate whether or not a current of the main cell at the side of the wireless power transmitter is determined as specified in the contract for wireless power transfer.

On the other hand, the wireless power transmitter 100 may generate a power transfer contract which is used for power charging with the wireless power receiver 200 based on the identification information and/or configuration information. The power transfer contract may include the limits of parameters determining a power transfer characteristic in the power transfer state 640.

The wireless power transmitter 100 may terminate the identification and configuration state 630 and return to the selection state 610 prior to entering the power transfer state 640. For instance, the wireless power transmitter 100 may terminate the identification and configuration state 630 to find another electronic device that can receive power in a wireless manner.

4) Power Transfer State

The wireless power transmitter 100 in the power transfer state 640 transmits power to the wireless power receiver 200.

Figure 18:
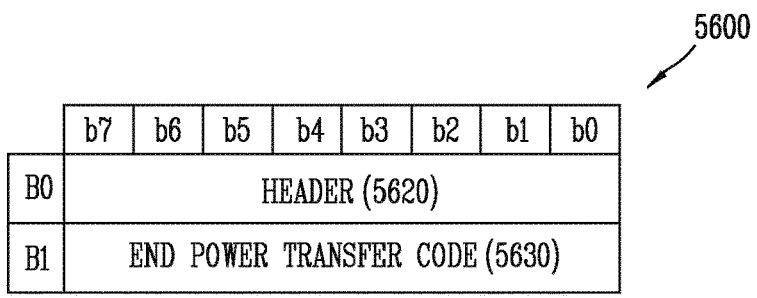

The wireless power transmitter 100 may receive a power control message from the wireless power receiver 200 while transferring power, and control a characteristic of the power applied to the transmitting coil in response to the received power control message. For example, the power control message used to control a characteristic of the power applied to the transmitting coil may be included in a control error packet 5500 as illustrated in FIG. 18. The packet 5500 may include a header 5520 for notifying that it is a control error packet and a message 5530 including a control error value. The wireless power transmitter 100 may control the power applied to the transmitting coil according to the control error value. In other words, a current applied to the transmitting coil may be controlled so as to be maintained if the control error value is "0," reduced if the control error value is a negative value, and increased if the control error value is a positive value.

The wireless power transmitter 100 may monitor parameters within a power transfer contract generated based on the identification information and/or configuration information in the power transfer state 640. As a result of monitoring the parameters, if power transmission to the wireless power receiver 200 violates the limits included in the power transfer contract, then the wireless power transmitter 100 may cancel the power transmission and return to the selection state 610.

The wireless power transmitter 100 may terminate the power transfer state 640 based on a power control message transferred from the wireless power receiver 200.

For example, if the charging of a battery has been completed while charging the battery using power transferred by the wireless power receiver 200, then a power control message for requesting the suspension of wireless power transfer will be transferred to the wireless power transmitter 100. In this case, the wireless power transmitter 100 may receive a message for requesting the suspension of the power transmission, and then terminate wireless power transfer, and return to the selection state 610.

For another example, the wireless power receiver 200 may transfer a power control message for requesting renegotiation or reconfiguration to update the previously generated power transfer contract. The wireless power receiver 200 may transfer a message for requesting the renegotiation of the power transfer contract when it is required a larger or smaller amount of power than the currently transmitted power amount. In this case, the wireless power transmitter 100 may receive a message for requesting the renegotiation of the power transfer contract, and then terminate contactless power transfer, and return to the identification and configuration state 630.

Figure 20:
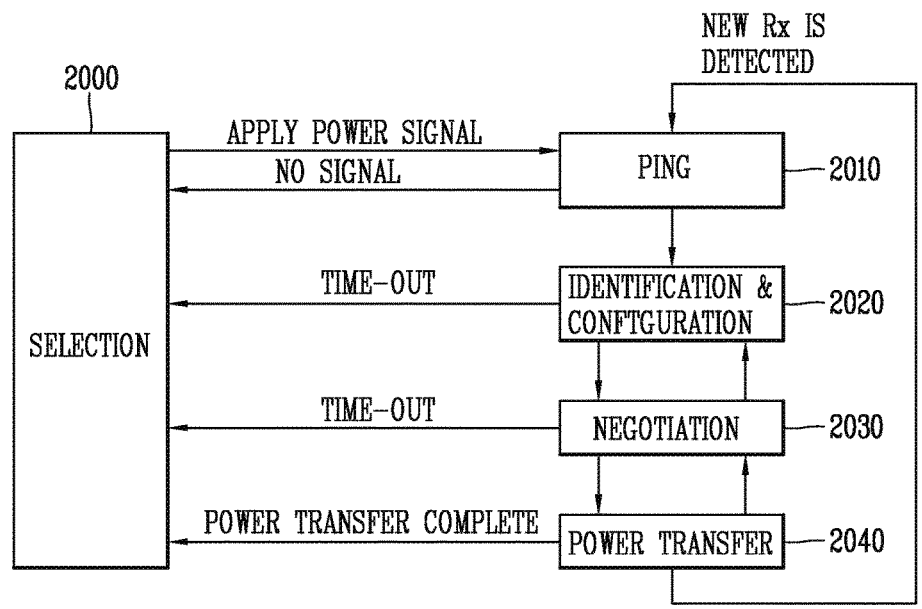
FIG. 20 is a flow chart illustrating a communication execution method in a resonant mode.

To this end, a message transmitted by the wireless power receiver 200, for instance, may be an end power transfer packet 5600 as illustrated in FIG. 20. The packet 5600 may include a header 5620 for notifying that it is an end power transfer packet and a message 5630 including an end power transfer code indicating the cause of the suspension. The end power transfer code may indicate any one of charge complete, internal fault, over temperature, over voltage, over current, battery failure, reconfigure, no response, and unknown error.

Communication Method of Plural Electronic Devices

Hereinafter, description will be given of a method by which at least one electronic device performs communication with one wireless power transmitter using wireless power signals.

Figure 19:
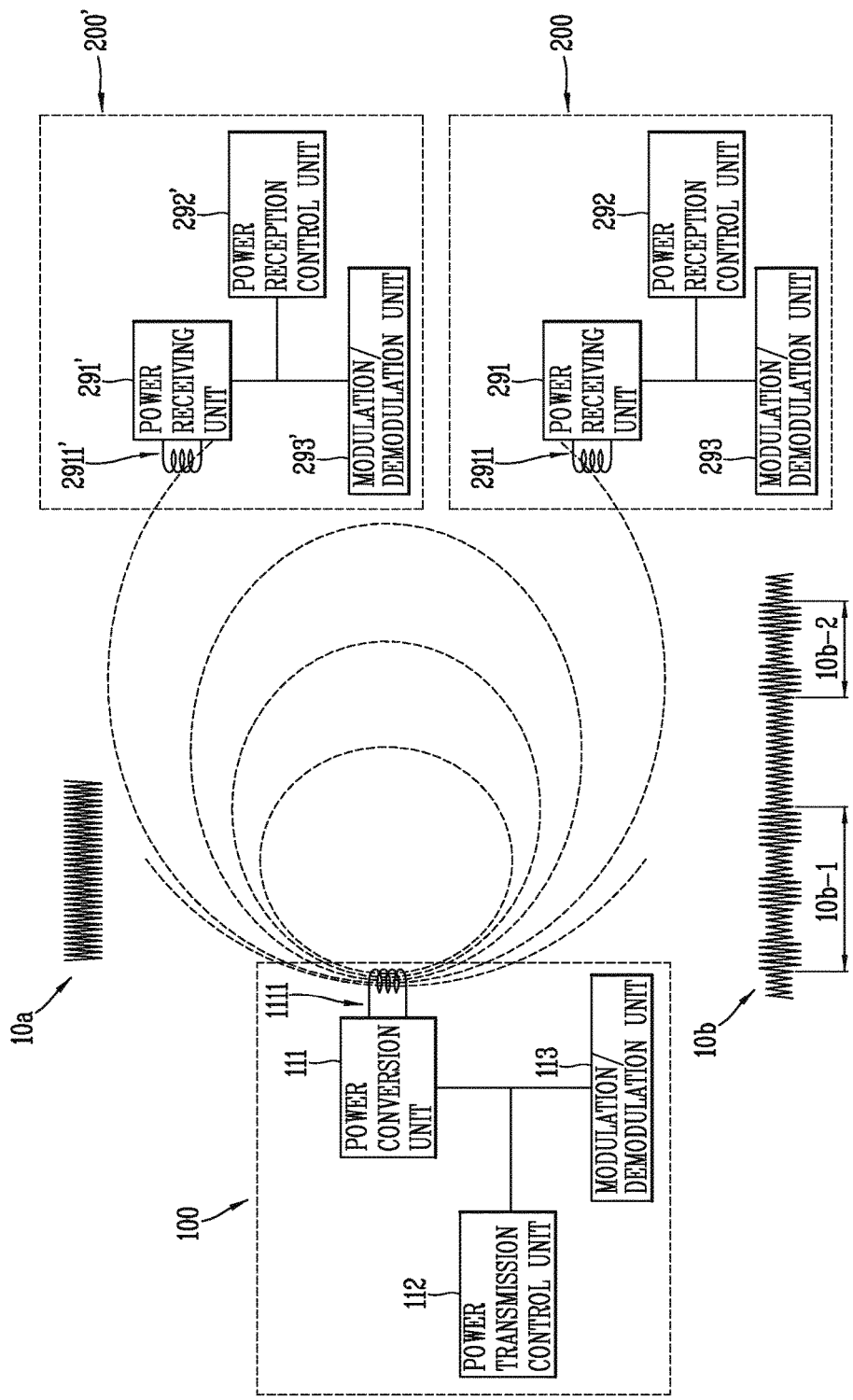
FIG. 19 is a conceptual view illustrating a method of transferring power to at least one wireless power receiver from a wireless power transmitter.

FIG. 19 is a conceptual view illustrating a method of transferring power to at least one wireless power receiver from a wireless power transmitter.

The wireless power transmitter 100 may transmit power to one or more wireless power receivers 200 and 200'. FIG. 19 illustrates two electronic devices 200 and 200', but the methods according to the exemplary embodiments disclosed herein may not be limited to the number of electronic devices shown.

An active area and a detection area may be different according to the wireless power transfer method of the wireless power transmitter 100. Therefore, the wireless power transmitter 100 may determine whether there is a wireless power receiver located on the active area or the detection area according to the resonance coupling method or a wireless power receiver located on the active area or the detection area according to the induction coupling method. According to the determination result, the wireless power transmitter 100 which supports each wireless power transfer method may change the power transfer method for each wireless power receiver.

In the wireless power transfer according to the exemplary embodiments disclosed herein, when the wireless power transmitter 100 transfers power to the one or more electronic devices 200 and 200' according to the same wireless power transfer method, the electronic devices 200 and 200' may perform communications through the wireless power signals without inter-collision.

Referring to FIG. 19, a wireless power signal 10a generated by the wireless power transmitter 100 may arrive at the first electronic device 200' and the second electronic device 200, respectively. The first and second electronic devices 200' and 200 may transmit wireless power messages using the generated wireless power signal 10a.

The first electronic device 200' and the second electronic device 200 may operate as wireless power receivers for receiving a wireless power signal. The wireless power receiver in accordance with the exemplary embodiments disclosed herein may include a power receiving unit 291', 291 to receive the generated wireless power signal, a modulation/demodulation unit 293', 293 to modulate or demodulate the received wireless power signal, and a controller 292', 292 to control each component of the wireless power receiver.

The foregoing description has described a mode in which one wireless power transmitter performs communication with one wireless power receiver in FIG. 13. Hereinafter, a mode in which one wireless power transmitter performs communication with a plurality of wireless power receivers will be described.

In the following description, it will be described that a mode in which one wireless power transmitter performs communication with one wireless power receiver is referred to as an inductive mode (or first mode), and a mode in which one wireless power transmitter performs communication with a plurality of wireless power receivers is referred to as a resonant mode (or second mode). A magnetic coupling coefficient of the inductive mode may be equal to or greater than 0.3, and a magnetic coupling coefficient of the resonant mode may be equal to or less than 0.1.

Hereinafter, a communication implementation method of a wireless power transmitter being operated in a resonance mode will be described in more detail. FIG. 20 is a flow chart illustrating a communication execution method in a resonant mode.

Referring to FIG. 20, a wireless power transmitter supporting a resonance mode according to an embodiment of the present disclosure may be divided into a selection phase 2000, an introduction phase 2010, a configuration phase 2020, a negotiation phase 2030, and a power transfer phase 2040.

First, the wireless power transmitter 100 according to an embodiment of the present disclosure may transmit a wireless power signal to sense a wireless power receiver. In other words, as illustrated in FIG. 13, the process of sensing a wireless power receiver using such a wireless power signal may be referred to as an analog ping.

Upon sensing the wireless power receiver, the wireless power transmitter 100 may transmit a power control message to the wireless power receiver. The process of detecting a wireless power receiver using the power control message may be referred to as a digital ping.

The wireless power receiver that has received the wireless power signal may enter the selection phase 2000. The wireless power receiver that has entered the selection phase 2000 may determine whether or not a frequency shift keying (FSK) is contained in the power control message. The FSK signal may be a signal for providing synchronization information, operating frequency and other information to the wireless power receiver.

At this time, the wireless power receiver may perform communication with any one scheme in an inductive mode or resonance mode according to whether or not the FSK signal is contained therein.

More specifically, the wireless power receiver may be operated in a resonance mode if the FSK signal is contained in the wireless power signal, and otherwise operated in an inductive mode.

When the wireless power receiver is operated in an inductive mode, the wireless power receiver may perform the foregoing communication scheme illustrated in FIG. 13.

When the wireless power receiver is operated in a resonance mode, the wireless power transmitter 100 may enter the introduction phase 2010. Referring to FIG. 20, the wireless power transmitter 100 may transmit a sync pattern for notify the start of a first frame to the wireless power receiver during the introduction phase 2010.

Furthermore, the wireless power transmitter 100 may transmit a sync pattern indicating a first slot among a plurality of slots constituting the first frame to a first wireless power receiver.

Then, the wireless power transmitter 100 may receive a control information (CI) packet from the wireless power receiver within the first slot. Here, the control information (CI) packet may include received power value information, control error value information, and the like.

On the other hand, the wireless power transmitter 100 may immediately receive a CI packet from a wireless power receiver within the first slot without transmitting the sync pattern indicating the first slot.

When the control information packet is sensed, the wireless power transmitter 100 may transmit an ACK (Acknowledge) or NAK (not-Acknowledge) signal to the wireless power receiver within the first slot. At this time, the wireless power transmitter 100 may transmit the ACK signal when the control information packet is successfully received within the first slot, and transmit the NAK signal when a second wireless power receiver different from the wireless power receiver that has transmitted the control information packet carries out the configuration phase 2020 or negotiation phase 2030.

If the ACK signal is received at the wireless power receiver, then the wireless power transmitter may allocate the first slot to the wireless power receiver. At this time, the wireless power receiver may transmit a control information packet using the allocated first slot during the configuration phase 2020, negotiation phase 2030, and power transfer phase 2040.

On the contrary, when the NAK signal is received at the wireless power receiver, the wireless power receiver may transmit the control information packet again to a second slot different from the first slot until receiving the ACK since the first slot is not allocated thereto.

When the first slot is allocated thereto, the wireless power receiver may enter the configuration phase 2020. At this time, the first wireless power transmitter 100 may provide locked slots during the configuration phase 2020 to receive data packets (for example, identification data packets (IDHI packet, IDLO packet), optionally proprietary data packets, GFB packet, etc.) from the wireless power receiver.

The locked slots may be at least part of free slots subsequent to the allocated first slot. Even at this time, the wireless power receiver may continuously transmit a control information packet through the first slot.

The wireless power transmitter 100 may receive data packets through the locked slots during the configuration phase 2020, and then enter the negotiation phase 2030. The first wireless power transmitter 100 may continuously provide locked slots during the configuration phase 2020, and receive one or more negotiation data packets from the wireless power receiver. For example, the wireless power receiver may receive negotiation data packets (specific request packet (SRQ) and general request packet (GRQ)) and optional proprietary packets using locked slots during the configuration phase 2020.

Even at this time, the wireless power receiver may continuously transmit a control information packet through the first slot.

When an SRQ/end-negotiation packet is received from the wireless power receiver, the wireless power transmitter 100 may transmit an ACK signal. At this time, upon receiving an ACK signal to the SRQ/end-negotiation packet, the first wireless power receiver may enter the power transfer phase 2040.

At this time, the power transfer phase 2040 may denote a state of transmitting power in a wireless manner. Furthermore, the wireless power transmitter 100 may no more provide locked slots during the power transfer phase 2040. At this time, the locked slots can be converted again into free slots.

At this time, the wireless power transmitter 100 may continuously allocate the first slot to the wireless power receiver until power transmission is terminated or a specific data packet (for example, EPT-packet) is received from the wireless power receiver. In this case, the wireless power receiver may continuously transmit a control information packet using the first slot of each frame during the power transfer phase 2040.

Furthermore, the wireless power receiver may transmit one or more data packets through a free packet during the 20040. For example, the wireless power receiver may transmit an end power transfer packet (EPT), a charge status packet (CHS) and proprietary data packets within the free slot.

When EPT is received while transmitting power during the power transfer phase 2040, the wireless power transmitter 100 may terminate power transmission, enter the configuration phase 2020 again, or enter the negotiation phase 2030 again according to the information of the EPT packet.

If the wireless power transmitter 100 terminates the transmission of power, then the wireless power transmitter 100 may convert the allocated first slot into a free slot. Then, the wireless power transmitter 100 may enter the selection phase 2000 again.

Figure 21:
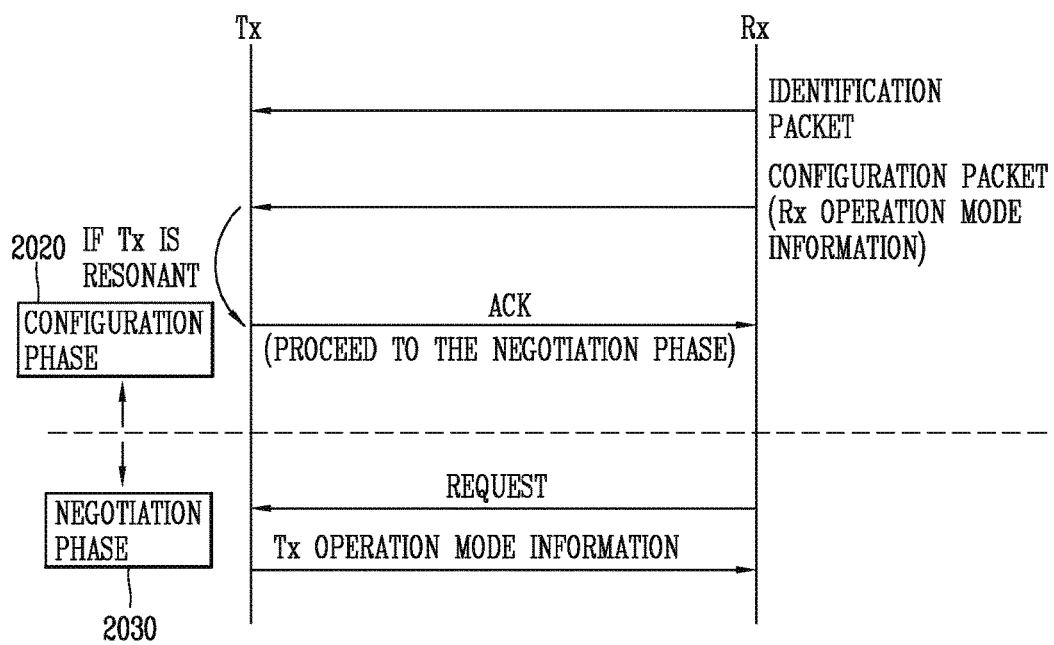
FIG. 21 is a flow chart illustrating a method of determining a communication execution mode.
Figure 23:
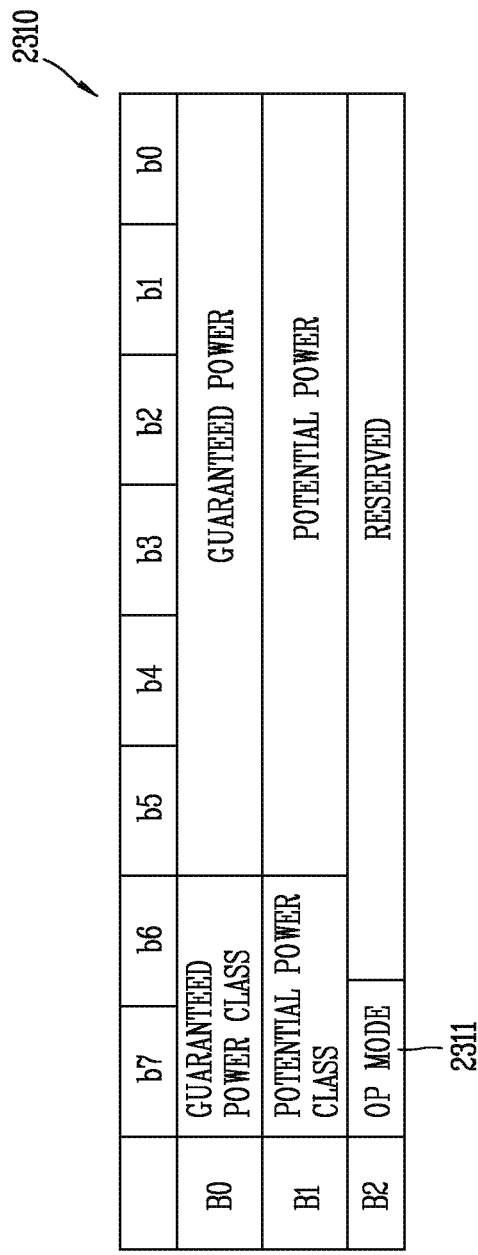
Figures 24, 25, 26:
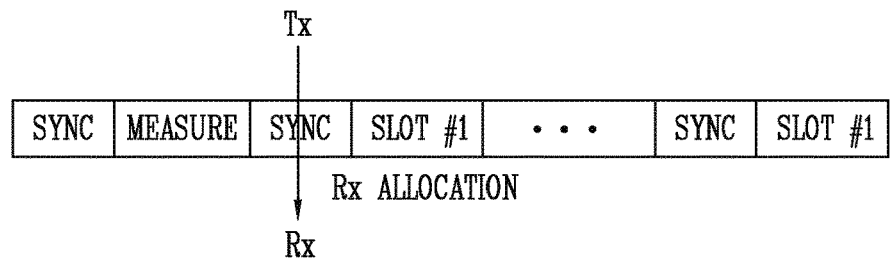
FIGS. 24 and 25 are tables illustrating a type of operation mode information.
FIG. 26 is a conceptual view illustrating a method of performing communication in a resonant mode.

Hereinafter, a method of determining a communication execution mode between a wireless power transmitter and a wireless power receiver will be described in more detail with reference to the accompanying drawings. FIG. 21 is a flow chart illustrating a method of determining a communication execution mode. FIGS. 22 and 23 are structural diagrams illustrating the structure of a setting packet. FIGS. 24 and 25 are tables illustrating a type of operation mode information.

In the WPC 1.0 standard specification, a method of allowing one wireless power transmitter 100 to transfer power to one wireless power receiver has been described. In recent years, technologies of allowing one wireless power transmitter 100 to transmit power a plurality of wireless power receivers at the same time have been developed. Accordingly, the present disclosure proposes a method of determining a mode in which communication is carried out between one wireless power transmitter 100 and a plurality of wireless power receivers for receiving power when the one wireless power transmitter 100 transmits power to a plurality of wireless power receivers at the same time.

When the power control message is received, the wireless power receiver enters the selection phase 2000. Furthermore, the wireless power receiver may determine a communication mode based on the FSK signal.

More specifically, when the power control message is received, the wireless power receiver may enter the selection phase 2000, and determine whether or not a FSK signal is contained in the power control message. As a result of the determination, the wireless power receiver may perform communication in a resonant mode when a FSK signal is contained therein, and perform communication in an inductive mode when the FSK signal is not contained therein.

When the communication mode is determined as an inductive mode, the wireless power receiver may perform communication disclosed in FIG. 13. On the contrary, when the communication mode is determined as a resonant mode, the wireless power receiver may perform communication disclosed in FIG. 20.

On the other hand, though a communication mode is determined from the introduction phase 2010 to perform communication according to the determined communication mode as illustrated in FIG. 20, the wireless power receiver may perform communication in an inductive mode for both the inductive mode and resonant mode from the selection phase 2000 to the configuration phase 2020, and perform communication in either one of the inductive mode and resonant mode from the negotiation phase 2030.

Hereinafter, a method of allowing the wireless power receiver to perform communication in an inductive mode from the selection phase 2000 to the configuration phase 2020, and perform communication in either one of the inductive mode and resonant mode during the negotiation phase 2030.

When a wireless power signal is received from a wireless power transmitter, the wireless power receiver may enter the introduction phase 2010. Then, the wireless power receiver may enter to the configuration phase 2020 from the introduction phase 2010.

When the wireless power receiver enters the configuration phase 2020, the wireless power receiver may transmit a power control message containing identification information to the wireless power transmitter. For example, as illustrated in FIG. 21, the wireless power receiver may transmit an identification packet containing a power control message.

Furthermore, the wireless power receiver 200 may transmit a power control message containing operation mode information. For example, as illustrated in FIG. 21, the wireless power receiver may transmit a configuration packet 2210 containing operation mode information.

Figure 16:
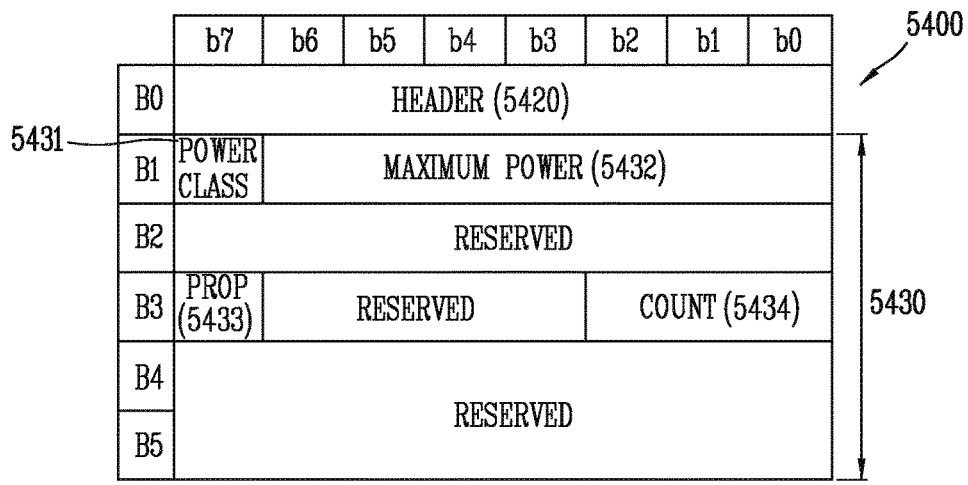

As illustrated in FIG. 22, the configuration packet 2210 may further include operation mode information 2211, contrary to FIG. 16.

The operation mode information 2211 may be information associated with the communication and power control of the wireless power receiver. More specifically, the operation mode information 2211 may include any one of version information, communication mode information, charging information and power control information of the wireless power receiver.

The version information may denote a standard specification with which the wireless power receiver complies. For example, when the wireless power receiver complies with any one of the WPC 1.0 standard specification, the WPC 1.1 standard specification and the WPC 2.0 standard specification, the version information may indicate any one standard specification thereof. For example, the version information is "0" when the wireless power receiver complies with the WPC 1.0 specification, and the version information is "1" when the wireless power receiver complies with the WPC 2.0 specification.

The communication mode information may include communication mode information that can be carried out by the wireless power receiver. More specifically, when the wireless power receiver complies with either one of the inductance mode and resonant mode, the communication mode information may indicate the either one mode. For example, the communication mode information may be "0" when the wireless power receiver complies with an inductance mode, and the communication mode information may be "1" when the wireless power receiver complies with a resonant mode.

The charging information may include mode information in which the wireless power receiver receives power. More specifically, when the wireless power receiver complies with either one of a one-to-one charging mode and a one-to-many charging mode, the charging information may indicate the either one mode. For example, the charging information may be "0" when the wireless power receiver complies with the one-to-one charging mode, and the charging information may be "1" when the wireless power receiver complies with the one-to-many charging mode. The one-to-one charging mode may denote a mode in which one wireless power transmitter transmits power to one wireless power receiver. Furthermore, the one-to-many charging mode may denote a mode in which one wireless power transmitter transmits power at least two wireless power receivers at the same time.

The power control information may indicate a control mode in which power is received at the wireless power receiver. More specifically, the power control information may indicate either one of a mode in which power transmitted to the wireless power receiver is controlled by the control of PID of the wireless power transmitter and a mode in which power transmitted to the wireless power receiver is controlled by the wireless power receiver itself. For example, the power control information may be "0" in case of a mode controlled by the control of PID of the wireless power transmitter, and the power control information may be "1" in case of a mode controlled by the wireless power receiver itself.

The operation mode information may be implemented in various forms and various information.

For example, considering the operation mode information with reference to FIG. 24, the wireless power transmitter may have any one of values, 00, 01 and 11, for the operation mode information, and wireless power receiver may have any one of values, 00 and 11, for the operation mode information. For example, referring to FIG. 24, when the operation mode information is "00", the wireless power receiver and wireless power transmitter may denote an operation mode in which the wireless power transmitter controls power in a one-to-one charging mode. For another example, when the operation mode information is "11", the wireless power receiver and wireless power transmitter may denote an operation mode in which the wireless power receiver itself controls power in a one-to-many charging mode. For still another example, when the operation mode information is "01", the wireless power transmitter may denote an operation mode in which the wireless power transmitter controls power in a one-to-one charging mode.

Contrary to FIG. 24, referring to FIG. 25, for another example of the operation mode information, the operation mode information may have "0" or "1". For example, when the operation mode information is "0", the wireless power transmitter and wireless power receiver may perform communication and transmit power according to an inductive mode, which is a one-to-one communication mode. For still another example, when the operation mode information is "1", the wireless power transmitter and wireless power receiver may perform communication and transmit power according to a resonant mode, which is a one-to-many communication mode.

The communication execution mode of the wireless power transmitter and wireless power receiver is determined by the operation mode information.

For example, when the operation mode information is like a table as shown in FIG. 24, the communication mode may be determined according to a third row of FIG. 24. For example, referring to a first column of table in FIG. 24, when the operation mode information of the wireless power transmitter is "00", and the operation mode information of the wireless power receiver is "00" or "11", the wireless power receiver may perform communication in a mode in which the wireless power transmitter controls power in a one-to-one charging mode.

For another example, referring to a second column of table in FIG. 24, when the operation mode information of the wireless power transmitter is "01", and the operation mode information of the wireless power receiver is "00", the wireless power receiver may perform communication in a mode in which the wireless power transmitter controls power in a one-to-many charging mode.

A communication mode for a case different from the foregoing cases is shown with reference to the table.

On the contrary, when the operation mode information is like a table shown in FIG. 25, a communication mode may be determined according to a third row of FIG. 25.

For example, referring to FIG. 25, when the wireless power receiver supports an inductive mode, and the wireless power transmitter supports an inductive mode, the wireless power transmitter and wireless power receiver may perform communication according to an inductive mode.

For another example, when the wireless power receiver supports an inductive mode, and the wireless power transmitter supports an inductive mode and a resonant mode, the wireless power transmitter and wireless power receiver may perform communication according to an inductive mode.

For still another example, when the wireless power receiver supports an inductive mode and a resonant mode, and the wireless power transmitter supports an inductive mode, the wireless power transmitter and wireless power receiver may perform communication according to an inductive mode.

For yet still another example, when the wireless power receiver supports a resonant mode, and the wireless power transmitter supports a resonant mode, the wireless power transmitter and wireless power receiver may perform communication according to a resonant mode.

The wireless power receiver may perform communication in an inductive mode prior to the negotiation phase 2030. In other words, the wireless power receiver may perform communication in an inductive mode during the selection phase 2000, the introduction phase 2010 and the identification phase 2020.

The wireless power transmitter may receive a configuration packet 2210 containing operation mode information from the wireless power receiver in the inductive mode, thereby receiving the communication mode information of the wireless power receiver.

Here, the wireless power transmitter may perform communication with the wireless power receiver based on the operation mode information. More specifically, when the operation mode information of the wireless power receiver is a resonant mode, the wireless power transmitter may transmit an ACK signal in response to the configuration packet 2210 when the wireless power transmitter supports a resonant mode, and may transmit a NAK signal when the wireless power transmitter does not support a resonant mode.

Here, when an ACK signal is transmitted from the wireless power transmitter, the wireless power receiver may enter the negotiation phase 2030 from the configuration phase 2020.

Furthermore, when the wireless power receiver enters the negotiation phase 2030, the wireless power receiver may perform communication with the wireless power transmitter based on the operation mode information.

More specifically, when the operation mode information is a resonant mode (for example, the operation mode information has "1"), the wireless power receiver may perform communication according to a resonant mode during the negotiation phase 2030. Here, the wireless power receiver may sequentially transmit preset packets according to the resonant mode. For example, the preset packet may include may include power amount information and the like as described above.

For example, as illustrated in FIG. 21, the wireless power receiver may transmit a configuration packet according to an inductive mode, and receive an ACK signal in response to the configuration packet during the configuration phase 2020. Upon receiving the ACK signal, the wireless power receiver may enter the negotiation phase 2030 during the configuration phase 2020, and perform communication according to a resonant mode during the negotiation phase.

Here, the wireless power transmitter may transmit information to the wireless power receiver according to the resonant mode during the negotiation phase 2030. For example, as illustrated in FIG. 23, the wireless power transmitter may transmit a configuration packet 2310 containing operation mode information 2311 associated with the wireless power transmitter. The operation mode information 2311 may be information associated with the communication mode of the wireless power transmitter. It may include the same type of information as that of the operation mode information 2211 transmitted by the foregoing wireless power receiver. Through this, the wireless power receiver may receive the operation mode information of the wireless power transmitter.

On the contrary, when the wireless power transmitter does not support a resonant mode in a state that the operation mode information of the wireless power receiver is in a resonant mode, the wireless power transmitter may transmit a NAK signal to the wireless power receiver.

More specifically, when operation mode information on a resonant mode is received from the wireless power receiver in case where the wireless power transmitter does not support a resonant mode but supports only an inductive mode, the wireless power transmitter may transmit a NAK signal to the wireless power receiver.

Here, the wireless power receiver may be switched to the selection phase 2000 again or enter the power transfer phase 2040. Here, the wireless power receiver may enter either one of the selection phase 2000 and power transfer phase 2040 based on an operation mode that can be supported by the wireless power receiver.

More specifically, when the wireless power receiver supports only a resonant mode, the wireless power receiver may be switched to the selection phase 2000 again without performing communication any longer with the wireless power transmitter. At this time, the wireless power receiver may receive a communication error signal from the wireless power transmitter.

Furthermore, the wireless power transmitter may be switched to the selection phase 2000 without entering the power transfer phase 2040, thereby not transmitting power to the wireless power receiver.

On the contrary, when the wireless power receiver is able to support both the resonant mode and inductive mode, the wireless power receiver may immediately enter the power transfer phase 2040 according to the inductive mode without passing through the negotiation phase 2030. In other words, the wireless power transmitter and wireless power receiver may perform communication according to an inductive mode during the power transfer phase 2040.

Furthermore, the wireless power transmitter may transmit power to the wireless power receiver while performing communication in an inductive mode during the power transfer phase 2040.

On the other hand, when the operation mode information of the wireless power receiver is an inductive mode, whether or not to transmit power may be determined according to whether or not the inductive mode is supported by the wireless power transmitter. More specifically, when the wireless power transmitter supports an inductive mode, the wireless power receiver may enter the power transfer phase 2040, and receive power from the wireless power transmitter. On the contrary, when the wireless power transmitter does not support an inductive mode, the wireless power receiver may receive a communication error signal, and be switched to the selection phase 2000 again. At this time, the wireless power receiver cannot receive power from the wireless power transmitter.

As described above, a communication method of a wireless power transmitter has been described.

Through this, the present disclosure may transmit operation mode information associated with a communication mode, thereby performing communication according to an accurate operation mode.

Furthermore, the present disclosure may determine a communication mode based on operation mode information, and perform communication in the determined communication mode, thereby reducing a communication error occurred when immediately performing communication in a resonant mode without operation mode information.

Hereinafter, a method of performing communication a resonant mode when the wireless power receiver and wireless power transmitter support the resonant mode will be described. FIG. 26 is a conceptual view illustrating a method of performing communication in a resonant mode.

When the wireless power receiver supports a resonant mode, the wireless power receiver may perform communication in a resonant mode when a FSK signal is received from the wireless power transmitter.

As described above, the wireless power receiver may transmit a configuration packet 2210 containing operation mode information 2211 indicating a resonant mode to the wireless power transmitter in response to the FKS signal during the configuration phase 2020.

Referring to FIG. 26, when the wireless power receiver is operated in a resonance mode, the wireless power transmitter 100 may perform communication in the unit of frame. The frame may denote a unit with a preset time length. For example, the frame may have a time interval of one second. In other words, the wireless power transmitter 100 may perform communication through a first frame for one second, and perform communication through a second frame for one second after the one second has passed.

At this time, referring to FIG. 26, the frame may include a sync pattern. The sync pattern may perform the role of distinguishing each frame. Furthermore, the sync pattern may perform the function of optimizing communication with the wireless power receiver through a frame.

The sync pattern may include a preamble, a start bit, a response field, an information field and a parity bit.

More specifically, the preamble consists of a number of bits, and the number of bits may be changed according to its operating frequency.

The start bit may denote zero as a bit following the preamble. The zero may denote a slot sync if it is "0", and denote a frame sync if it is "1".

The parity bit, as the last bit of the sync pattern, becomes "1" when the data fields (i.e., response, type, information field) of a sync pattern have even bits, and otherwise becomes "0".

Considering the data fields (i.e., response, type, information field) in more detail, the response field may include response information on the implementation of communication from the wireless power receiver within a slot prior to the sync pattern. For example, the response field may include response information such as when the implementation of communication is not sensed, when a communication error occurs, when a data packet is correctly checked from the wireless power receiver, and when a data packet is rejected from the wireless power receiver. Furthermore, the sync field may be a type field indicating the type of sync pattern. More specifically, when a sync pattern to which the sync field belongs is a first sync pattern of the frame (namely, when located prior to a measurement field as a first sync pattern of the frame), the sync field may indicate that the sync pattern to which the sync field belongs is a frame sync (for example, set to "1"). In addition, when a sync pattern to which the sync field belongs is not a first sync pattern of the frame, namely, the other sync fields belonging to a different sync pattern other than the first sync pattern of the frame, may indicate that a sync pattern to which the relevant sync field belongs is a slot sync (for example, set to "0") in a slotted frame.

Furthermore, the meaning of a value of the usage field, as an information field, may be determined according to the type of a sync pattern indicated by the sync field. For example, when the sync field is "1", the meaning of the usage field may indicate the type of frame. In other words, the usage field may notify that a current frame is a slotted frame or free-format frame. Otherwise, when the sync field is "0", the usage field may indicate the state of a slot. In other words, the usage field may notify information on whether the next slot is a slot allocated to a specific wireless power receiver, a slot temporarily locked by a specific wireless power receiver or a slot in which a wireless power receiver is freely used.

Furthermore, the frame may consist of two types of frames, such as a slotted frame and a free-format frame. The slotted frame is a frame with a plurality of slots, and the free-format frame is a frame with no plurality of slots.

The slotted frame may have a measurement slot in which a wireless power transmitter and a wireless power receiver freely perform communication subsequent to the sync signal.

The slotted frame may have a plurality of slots for performing communication with a wireless power receiver subsequent to the measurement slot. For example, the number of slots may be set to nine. The slot may have a specific time interval. For example, the slot may be formed to have a time interval of 50 ms.

The slot may include at least one of an allocated slot, a free slot, a measurement slot and a locked slot. The allocated slot is a slot used by a specific wireless power receiver, and the free slot is a slot in which a wireless power receiver is freely used, and the measurement slot is a slot that does not perform communication with a wireless power receiver to measure transmitted and received power, and the locked slot is a slot that is temporarily locked to be used by a specific receiver.

On the other hand, the free-format frame may not have an additional specific format subsequent to the measurement slot. In this case, the wireless power receiver can transmit data packets having a long length through the free-format frame.

The wireless power transmitter 100 according to the present disclosure may perform communication through the frame.

More specifically, when operated in a resonant mode, the wireless power transmitter 100 may transmit a first sync signal indicating a first slot among a plurality of slots constituting a first frame to the wireless power receiver.

Here, a sync signal indicating a slot may have either one format of a pattern or packet. For example, when the sync signal is a sync pattern with a pattern format, it has a preset number of bits. Furthermore, a specific bit of the sync pattern may indicate unique identification information (for example, ID information) of the wireless power receiver. For another example, when the sync signal is a sync packet with a packet format, the sync packet may include the status information of the wireless power receiver (for example, received power amount information (received power packet), end power transfer packets, etc.) and identification information (for example, ID information). The present specification describes a case where the sync signal is a sync pattern, but even in case of a sync packet, the same control method may be applicable thereto.

Then, the wireless power transmitter 100 may receive a control information (CI) packet from the first wireless power receiver within the first slot. Here, the control information (CI) packet may include received power value information, control error value information, and the like.

When the control information packet is sensed, the wireless power transmitter 100 may transmit an ACK (Acknowledge) or NAK (not-Acknowledge) signal to the first wireless power receiver within the first slot. At this time, the wireless power transmitter 100 may transmit the ACK signal when the control information packet is successfully received within the first slot, and transmit the NAK signal when a second wireless power receiver different from the first wireless power receiver that has transmitted the control information packet carries out the configuration phase 2020 or negotiation phase 2030.

If the ACK signal is received at the first wireless power receiver, then the wireless power transmitter may allocate the first slot to the first wireless power receiver. At this time, the wireless power receiver may transmit a control information packet using the allocated first slot during the configuration phase 2020, negotiation phase 2030, and power transfer phase 2040.

On the contrary, when the NAK signal is received at the wireless power receiver, the first wireless power receiver may transmit the control information packet again to a second slot different from the first slot until receiving the ACK since the first slot is not allocated thereto. More specifically, the wireless power receiver may receive a second sync signal indicating the second slot from the wireless power transmitter. Subsequent to receiving the second sync signal, the allocation of the second slot is similar to a method of allocating the first slot, and thus the detailed description thereof will be omitted.

When the first slot is allocated thereto, the first wireless power receiver may enter the negotiation phase 2030. At this time, the first wireless power transmitter 100 may provide locked slots during the negotiation phase 2030 to receive data packets (for example, identification data packets (IDHI packet, IDLO packet), optionally proprietary data packets, GFB packet, etc.) from the wireless power receiver.

The locked slots may be at least part of free slots subsequent to the allocated first slot. Even at this time, the first wireless power receiver continuously transmit a control information packet through the first slot.

The first wireless power transmitter 100 may continuously provide locked slots in the configuration phase 2020 during the negotiation phase 2030, and receive one or more negotiation data packets from the first wireless power receiver. For example, the first wireless power receiver may receive negotiation data packets (specific request packet (SRQ) and general request packet (GRQ)) and optional proprietary packets using locked slots during the configuration phase 2020. Even at this time, the first wireless power receiver may continuously transmit a control information packet through the first slot.

When an SRQ/end-negotiation packet is received from the wireless power receiver, the wireless power transmitter 100 may transmit an ACK signal. At this time, upon receiving an ACK signal to the SRQ/end-negotiation packet, the wireless power receiver may enter the power transfer phase 2040.

At this time, the power transfer phase 2040 may denote a state of transmitting power in a wireless manner. Furthermore, the wireless power transmitter 100 may no more provide locked slots during the power transfer phase 2040. At this time, the locked slots can be converted again into free slots.

At this time, the wireless power transmitter 100 may continuously allocate the first slot to the wireless power receiver until power transmission is terminated or a specific data packet (for example, EPT-packet) is received from the wireless power receiver. In this case, the wireless power receiver may continuously transmit a control information packet using the first slot of each frame during the power transfer phase 2040.

Furthermore, the wireless power receiver may transmit one or more data packets through a free packet during the 20040. For example, the wireless power receiver may transmit an end power transfer packet (EPT), a charge status packet (CHS) and proprietary data packets within the free slot.

When EPT is received while transmitting power during the power transfer phase 2040, the wireless power transmitter 100 may terminate power transmission, enter the configuration phase 2020 again, or enter the negotiation phase 2030 again according to the information of the EPT packet.

If the wireless power transmitter 100 terminates the transmission of power, then the wireless power transmitter 100 may convert the allocated first slot into a free slot. Then, the wireless power transmitter 100 may enter the selection phase 2000 again.

In a wireless charging system in which a one-to-one charging modes and a one-to-many charging mode are mixed, operation mode information may be transmitted and received between each wireless power transmitter and wireless power receiver, thereby performing communication with a suitable communication mode.

Furthermore, the present disclosure may reduce communication error using operation mode information.

Furthermore, in a one-to-may charging system, the present disclosure may perform communication through a slot structure, thereby performing power transmission and communication with respect to a plurality of wireless power receivers at the same time.

However, it would be easily understood by those skilled in the art that the configuration of a wireless power transmitter according to the embodiment disclosed herein may be applicable to an apparatus, such as a docking station, a terminal cradle device, and an electronic device, and the like, excluding a case where it is applicable to only a wireless charger.

The scope of the invention will not be limited to the embodiments disclosed herein, and thus various modifications, variations, and improvements can be made in the present invention without departing from the spirit of the invention, and within the scope of the appended claims.

The invention claimed is:

1. A wireless power transmitter for transferring power to a wireless power receiver in a wireless manner, the wireless power transmitter comprising:
a power transmission control unit configured to detect the wireless power receiver; and
a power conversion unit configured to transfer the power to the wireless power receiver;
wherein the wireless power transmitter is configured to:
receive at least one of an identification packet or a configuration packet transmitted in a first mode from the wireless power receiver;
determine, based on the configuration packet, whether or not the wireless power receiver supports a second mode different from the first mode; and
communicate with the wireless power receiver in at least one of the first mode or the second mode when the wireless power receiver supports the second mode,
wherein the first mode is used for communication between one wireless power transmitter and one wireless power receiver, and the second mode is used for communication between one wireless power transmitter and a plurality of wireless power receivers, and
wherein the configuration packet comprises operation mode information indicating a communication execution mode supported by the wireless power receiver.

2. The wireless power transmitter of claim 1, wherein the wireless power transmitter is further configured to:
perform communication with the wireless power receiver according to the first mode while the power is transferred when the operation mode information indicates the first mode; and
perform communication with the wireless power receiver according to the second mode while the power is transferred when the operation mode information indicates the second mode.

3. The wireless power transmitter of claim 2, wherein when the operation mode information indicates the second mode, the wireless power transmitter is further configured to:
transmit a first sync signal linked to a first slot among a plurality of slots;
receive control information from the wireless power receiver within the first slot in response to the first sync signal; and
determine whether or not to allocate the first slot to the wireless power receiver.

4. The wireless power transmitter of claim 3, wherein when the first slot is not allocated to the wireless power receiver, the wireless power transmitter is further configured to:
transmit a second sync signal linked to a second slot different from the first slot among the plurality of slots;
receive control information from the wireless power receiver within the second slot in response to the second sync signal; and
determine whether or not to allocate the second slot to the wireless power receiver.

5. The wireless power transmitter of claim 3, wherein the first sync signal and the second sync signal have a pattern or packet form.

6. The wireless power transmitter of claim 3, wherein the operation mode information is transmitted to the wireless power receiver through the first slot.

7. The wireless power transmitter of claim 1, wherein the wireless power transmitter is further configured to:
transmit a configuration packet of the wireless power transmitter to the wireless power receiver based on the operation mode information,
wherein the configuration packet of the wireless power transmitter comprises the operation mode information of the wireless power transmitter.

8. The wireless power transmitter of claim 1, wherein when the operation mode information indicates the second mode, but the second mode is not supported, communication error information is transmitted to the wireless power receiver, and power is not transmitted to the wireless power receiver.

9. A wireless power receiver for receiving power from a wireless power transmitter in a wireless manner, the wireless power receiver comprising:
a power unit configured to receive the power from the wireless power transmitter; and
a controller configured to control the wireless power receiver,
wherein the wireless power receiver is configured to:
transmit at least one of an identification packet or a configuration packet to the wireless power transmitter in a first mode;
determine, based on the configuration packet, whether or not the wireless power receiver supports a second mode different from the first mode; and
communicate with the wireless power transmitter in at least one of the first mode or the second mode when the wireless power receiver supports the second mode,
wherein the first mode is used for communication between one wireless power transmitter and one wireless power receiver, and the second mode is used for communication between one wireless power transmitter and a plurality of wireless power receivers, and
wherein the configuration packet comprises operation mode information indicating a communication execution mode supported by the wireless power receiver.

10. The wireless power receiver of claim 9, wherein communication is carried out between the wireless power transmitter and the wireless power receiver based on the operation mode information.

11. The wireless power receiver of claim 9, wherein the power is received from the wireless power transmitter when the operation mode information indicates the first mode, and preset packets containing a power control message are sequentially transmitted to the wireless power transmitter when the operation mode information indicates the second mode.

12. The wireless power receiver of claim 9, wherein when communication error information is received in response to the configuration packet, power is not received from the wireless power transmitter.

* * * * *